United States Patent
Tal et al.

(10) Patent No.: US 10,410,100 B1
(45) Date of Patent: Sep. 10, 2019

(54) AM SCREENING

(71) Applicant: LANDA CORPORATION LTD., Rehovot (IL)

(72) Inventors: David Tal, Rehovot (IL); Shahar Klinger, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 16/191,249

(22) Filed: Nov. 14, 2018

Related U.S. Application Data

(60) Provisional application No. 62/585,556, filed on Nov. 14, 2017.

(51) Int. Cl.
| | |
|---|---|
| G06K 15/02 | (2006.01) |
| G06K 15/10 | (2006.01) |
| B41J 2/045 | (2006.01) |
| B41J 2/21 | (2006.01) |
| H04N 1/52 | (2006.01) |
| H04N 1/50 | (2006.01) |

(Continued)

(52) U.S. Cl.
CPC ...... *G06K 15/1881* (2013.01); *B41J 2/04586* (2013.01); *B41J 2/21* (2013.01); *G06K 15/102* (2013.01); *G06K 15/1873* (2013.01); *H04N 1/52* (2013.01); *H04N 1/405* (2013.01); *H04N 1/4056* (2013.01); *H04N 1/4058* (2013.01); *H04N 1/50* (2013.01); *H04N 1/58* (2013.01)

(58) Field of Classification Search
None
See application file for complete search history.

(56) References Cited

U.S. PATENT DOCUMENTS

| | | | |
|---|---|---|---|
| 2,839,181 | A | 6/1958 | Renner |
| 3,697,568 | A | 10/1972 | Boissieras et al. |

(Continued)

FOREIGN PATENT DOCUMENTS

| | | |
|---|---|---|
| CN | 1758703 A | 4/2006 |
| EP | 1111905 A2 | 6/2001 |

(Continued)

OTHER PUBLICATIONS

Aurenhammer F., et al., "Voronoi Diagrams—A Survey of a Fundamental Geometric Data Structure," ACM Computing Surveys, vol. 23 (3), Sep. 1991, pp. 345-405.

(Continued)

*Primary Examiner* — Miya J Williams
(74) *Attorney, Agent, or Firm* — Marc Van Dyke; Fourth Dimension IP

(57) ABSTRACT

Apparatus and methods for printing multi-level and multi-color digital image are disclosed herein. In some embodiments, first and second level AM half-tone screens are respectively applied to first and second multi-level color-components of the multi-level and multi-color input digital image to respectively generate first and second target binary images. The first and second target binary images are printed respectively using first and second inks (e.g. of different colors) onto a common surface. Specific properties of the AM half-tone screens as well as techniques for producing the AM half-tone screens are disclosed herein. In some embodiments, the techniques overcome objectionable textures derived from rounding errors in divisional of conventional AM supercells.

6 Claims, 24 Drawing Sheets

(51) Int. Cl.
*H04N 1/405* (2006.01)
*H04N 1/58* (2006.01)

(56) References Cited

U.S. PATENT DOCUMENTS

| | | | |
|---|---|---|---|
| 5,128,091 A | 7/1992 | Agur et al. | |
| 5,532,314 A | 7/1996 | Sexsmith et al. | |
| 5,859,955 A | 1/1999 | Wang | |
| 6,128,099 A | 10/2000 | Delabastita | |
| 6,724,501 B2 | 4/2004 | Atkins et al. | |
| 6,970,674 B2 | 11/2005 | Sato et al. | |
| 7,471,421 B2 | 12/2008 | Asai et al. | |
| 7,532,365 B2 | 5/2009 | Asai et al. | |
| 7,782,493 B2 | 8/2010 | Asai et al. | |
| 7,821,672 B2 | 10/2010 | Asai | |
| 8,038,284 B2 | 10/2011 | Hori et al. | |
| 8,149,463 B2 | 4/2012 | Kawamura | |
| 8,149,464 B2 | 4/2012 | Kim | |
| 8,441,688 B2* | 5/2013 | Kawamura | H04N 1/4051 358/1.9 |
| 8,848,254 B2 | 9/2014 | Hahm et al. | |
| 9,167,130 B2 | 10/2015 | Damera-Venkata et al. | |
| 9,284,469 B2 | 3/2016 | Song et al. | |
| 2002/0051147 A1 | 5/2002 | Asai | |
| 2002/0163528 A1 | 11/2002 | Cooper | |
| 2004/0020382 A1 | 2/2004 | McLean et al. | |
| 2004/0130753 A1 | 7/2004 | Crounse et al. | |
| 2004/0140179 A1 | 7/2004 | Saeki | |
| 2004/0252346 A1 | 12/2004 | Huang et al. | |
| 2005/0052468 A1 | 3/2005 | Kroon | |
| 2005/0155502 A1* | 7/2005 | Shigeta | H04N 1/405 101/170 |
| 2006/0061825 A1* | 3/2006 | Nakahara | H04N 1/4058 358/3.06 |
| 2007/0019241 A1* | 1/2007 | Yamakado | H04N 1/4051 358/3.14 |
| 2007/0054981 A1 | 3/2007 | Yanagi et al. | |
| 2007/0236738 A1 | 10/2007 | Hara et al. | |
| 2008/0239401 A1 | 10/2008 | Stevens | |
| 2009/0074492 A1 | 3/2009 | Ito | |
| 2009/0116885 A1 | 5/2009 | Ando | |
| 2010/0290089 A1 | 11/2010 | Stevens | |
| 2011/0044724 A1 | 2/2011 | Funamoto et al. | |
| 2011/0157654 A1 | 6/2011 | Wang et al. | |
| 2011/0292451 A1* | 12/2011 | Harvill | H04N 1/54 358/3.03 |
| 2012/0013693 A1 | 1/2012 | Tasaka et al. | |
| 2012/0156624 A1 | 6/2012 | Rondon et al. | |
| 2012/0243052 A1* | 9/2012 | Kakutani | H04N 1/4051 358/3.13 |
| 2014/0226187 A1 | 8/2014 | Sagimori | |
| 2019/0098173 A1* | 3/2019 | Kunstetter | G03G 15/556 |

FOREIGN PATENT DOCUMENTS

| | | |
|---|---|---|
| EP | 1646222 A2 | 4/2006 |
| JP | S6076343 A | 4/1985 |
| JP | H10210295 A | 8/1998 |
| JP | H11177821 A | 7/1999 |
| JP | 2004357288 A | 12/2004 |
| RU | 2180675 C2 | 3/2002 |
| RU | 2282643 C1 | 8/2006 |
| WO | 9604339 A1 | 2/1996 |
| WO | 9942509 A1 | 8/1999 |
| WO | 0064685 A1 | 11/2000 |
| WO | 02065755 A1 | 8/2002 |
| WO | 02094912 A1 | 11/2002 |
| WO | 2010042784 A3 | 7/2010 |

OTHER PUBLICATIONS

Heidelberg—An Introduction to Screening Technology.
JPH11177821A Machine Translation (by EPO and Google)—published Jul. 2, 1999; Dainippon Screen Mfg.
JPS6076343A Machine Translation (by EPO and Google)—published Apr. 30, 1985; Toray Industries.
JPH10210295A Machine Translation (by EPO and Google)—published Aug. 7, 1998; Seiko Epson Corp.

* cited by examiner

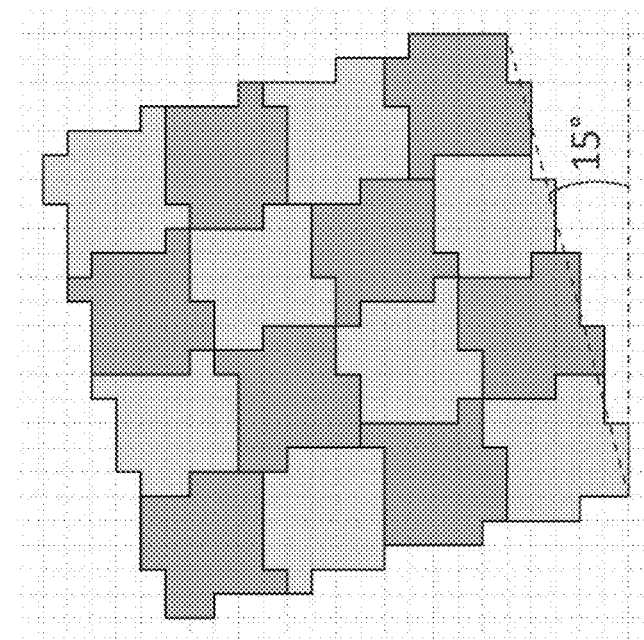
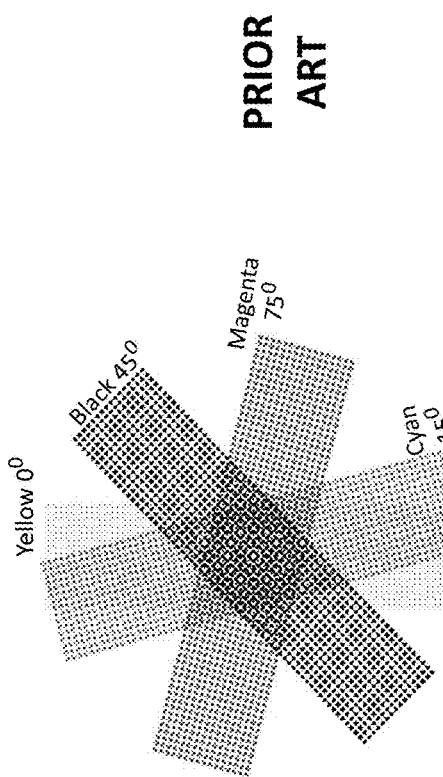
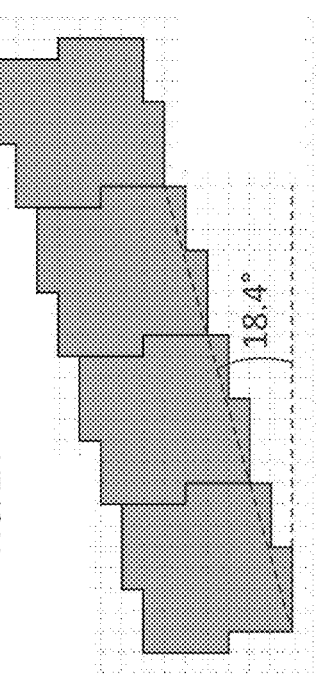
FIG. 1A PRIOR ART
FIG. 1B
FIG. 1C

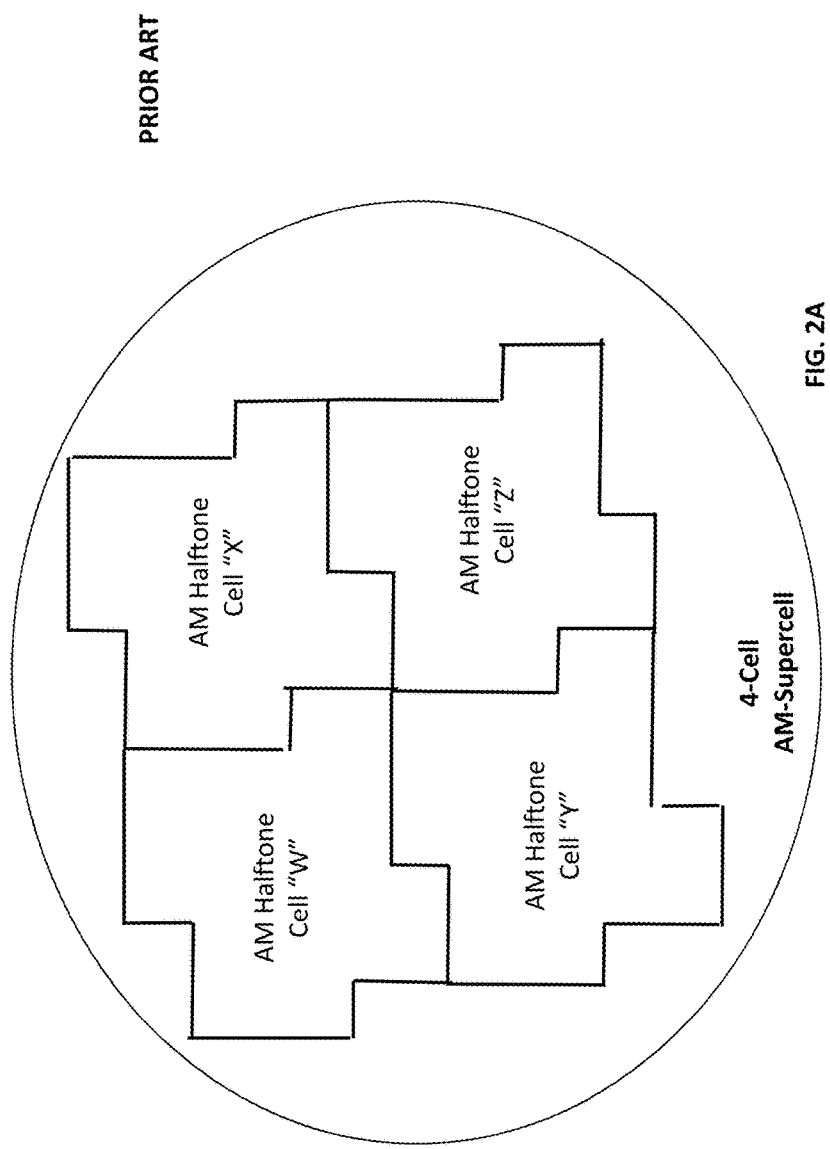

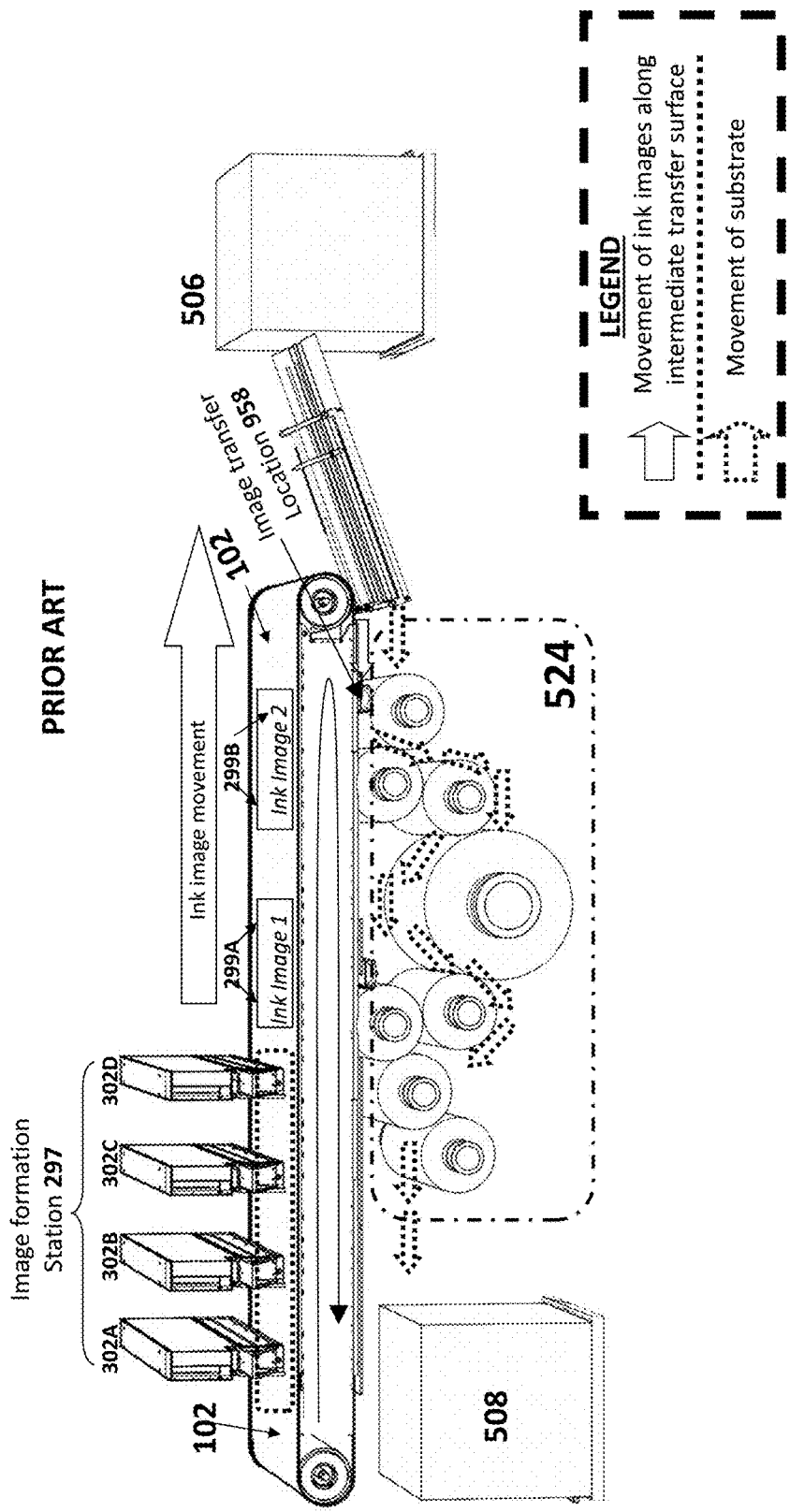

| Cell A | Cell B | Cell C | Cell D |
| --- | --- | --- | --- |
| Cell E | Cell F | Cell G | Cell H |
| Cell I | Cell J | Cell K | Cell L |
| Cell M | Cell N | Cell O | Cell O |

FIG. 8D

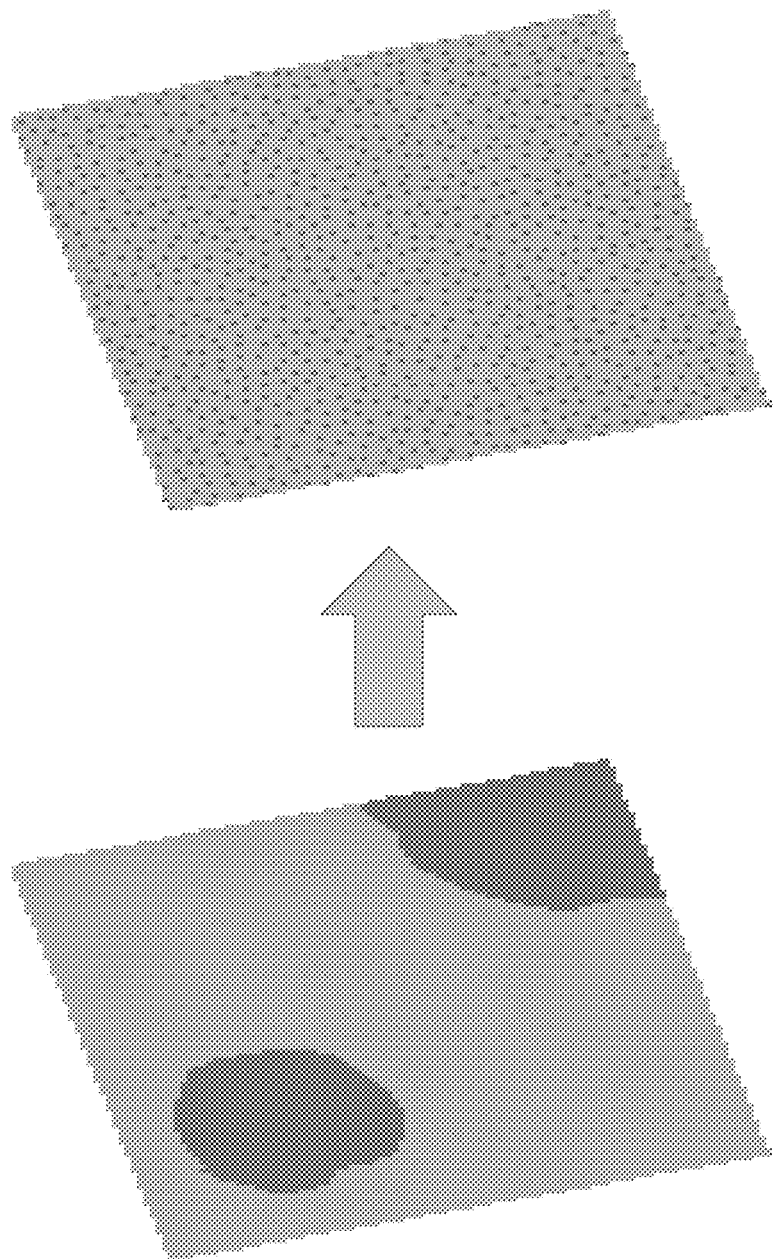

AM SCREENING

CROSS-REFERENCE TO RELATED APPLICATIONS

The present application claims priority to U.S. Provisional Application No. 62/585,556 filed on Nov. 14, 2017, which is incorporated by reference herein in its entirety.

FIELD

Embodiments of the present invention relate to methods for improved amplitude modulation (AM) halftoning screening and to digital printing systems for the same.

BACKGROUND

AM Halftoning (Discussion of FIGS. 1A-1B)

Wikipedia defines halftoning as "the reprographic technique that simulates continuous tone imagery through the use of dots, varying either in size or in spacing, thus generating a gradient-like effect." Wikipeida adds that "Where continuous tone imagery contains an infinite range of colors or greys, the halftone process reduces visual reproductions to an image that is printed with only one color of ink, in dots of differing size (amplitude modulation) or spacing (frequency modulation)."

Most presses are bi-level: they can either put ink on the target surface (e.g. onto paper or onto an intermediate transfer member (ITM) surface), or not. They cannot produce different shades of that ink.

In order to simulate shades, halftone screening is used.

In AM halftone screening, the original image is converted into a grid of equidistant dots, of varying sizes. Light areas are simulated by small dots, dark areas by large dots.

Embodiments of the present invention relate to improved AM halftoning techniques, and to improved techniques for generating AM half-toning screens.

To maximize the color gamut of the printing apparatus and to0 overcome deviations in registration, the dot grid of every ink is rotated at a different angle. To eliminate objectionable interference patterns between grids, each grid must be separated by exactly 30° from the other grids. The exception is the yellow ink, which can be separated by only 1520 .

The traditional angles in four-color printing are: (i) Cyan=15°; (ii) Magenta=75°; (iii) Yellow=0°; and (iv) Black=45°. When superimposed, all 4 inks create a characteristic "rosette" pattern, an example of which is shown in FIG. 1A.

Since the halftone grid is aligned to the printer's dot grid, the accuracy of the rotation angle is limited by the printer's resolution (e.g., for a 7×7 pixels grid cell, the closest approximation to 15° is 18.4°). This is illustrated in FIG. 1B.

Magenta is a mirror of the cyan screen, therefore it suffers the same problem. Yellow and black are aligned to the dot grid, and do not have a problem. Inaccuracy in a grid's angle will introduce interference patterns when superimposing screens (also known as a Moiré pattern).

AM Supercells (Discussion of FIGS. 1C and 2A-2B)

One solution to achieving better angle accuracy is by using a supercell.

One example of a supercell is shown in FIG. 1C. A supercell is a large cell that has large integers for the tangent ratio. It allows small angular increments, thereby achieving a better angle accuracy. This supercell is divided into smaller sub-cells that form the halftone grid at the desired frequency (distance between cells).

FIG. 2A illustrates an AM-half-toning supercell made up of four AM halftone cells. FIG. 2B relates to the example where there are 138 halftone levels. In particular, illustrates an illumination sequence of the halftone levels—first a pixel in cell "W" is illuminated, (see the '1' near the center of 'W'), then a pixel in cell "X" is illuminated, (see the '2' near the center of 'X') ,then a pixel in cell "Y" is illuminated, (see the '3' near the center of 'Y') , and then a pixel in cell "Z" is illuminated, (see the '4' near the center of 'Z'). Inspection of FIG. 2B shows that this 'W, X, Y, Z' illumination sequence is repeated.

Within cell W, the illumination sequence is first the '1' pixel, then the '5' pixel,' then the '9 pixel,' then the '13' pixel, then the 17 'pixel' and so on. Thus, within the W AM halftone cell, a pattern is followed where a generally 'round' dot appears and then grows. This is typical of AM halftoning, and is also true for the X, Y and Z AM halftone cells.

Printing System (Discussion of FIGS. 3A-3B)

FIG. 3A illustrates a printing system where ink images 299A, 299B are formed (e.g. by deposition of droplets of ink) at an image forming station 297 (e.g. ink-jet based) on the surface of an intermediate transfer member (ITM) 102. Image forming station 297 comprises one or more print bars 302A, 302B, 302C, 302D—e.g. oriented along a cross-print direction that is perpendicular to the direction of movement of the ITM.

After formation at image formation station 297, the ink images 298 are transported along the surface of the ITM 102 to an image transfer location 958 where the ink-images are transferred to substrate (e.g. web substrate or sheet substrate). In the non-limiting example of FIG. 1, sheet substrate from input supply 506 is transported by a substrate-transport-system (STS) 524 (i) to the image transfer location 958 and (ii) subsequently to an output stack 508 of substrate.

In the particular example of FIGS. 3A-3B, the intermediate transfer member 102 is a flexible blanket mounted over a plurality of rollers—however, in other embodiments the ITM 102 may be a drum. In yet other embodiments, the ink image may be printed directly onto substrate. Presently-disclosed teachings may be applied for any ink-jet printing system where an image is ink-jetted onto a target (e.g. ITM 102 or substrate) from one or more multi-nozzle print heads.

FIG. 3B illustrates the one or more print-bars 302A-302D.

For the present disclosure, a 'target surface' is a surface to which an image is printed (i.e. by ink-jetting). In one example, the target surface is an ITM surface. In another example, the target surface is substrate.

A 'print bar' 302 comprises one or more print-heads. As a target surface moves underneath the print-head, an ink-jet image is printed onto the target surface by print head(s) of the print bar by droplet deposition.

The 'print direction' is the direction of movement of a target surface (e.g. ITM or substrate) as the ink-jet image is deposited onto the target surface from the print-bar. A cross-print direction is the direction perpendicular to the print direction.

When a color digital image is printed by a plurality of print-bars (see FIGS. 3A-3B), each print-bar deposits on a target surface ink droplets of a different color (e.g. CMYK).

Before printing, the color digital image is AM-screened. In particular, a different respective AM half-tone screen is applied to color digital image.

Suppose there are M print bar (M is a positive integer, M>1)—these print bars are designated as PB[1], . . . PB[M]. A plurality of AM screens AMS[1], . . . AMS[M] is provided. The digital image is subjected to screening by the first AM screen AMS[1] and printed by the first print bar PB[1], subjected to screening by the second AM screen AMS[2] and printed by the second print bar PB[2], and so on.

For the present disclosure, unless indicated otherwise, an AM cell or AM-halftone cell refers to an individual cell that may be part of a supercell, rather than to a supercell.

SUMMARY OF EMBODIMENTS

A downside of conventional supercells relates to the discrete nature of the printer's dot grid. In particular, rounding errors in the division of the supercell cause sub-cells to differ in the number of pixels that comprise them. When printing a uniform gray level, the number of dots printed in each sub-cell will be different, creating an objectionable texture.

Embodiments of the invention relate to techniques for reducing or eliminating this objectionable texture.

An AM-halftone-based printing method comprising: a. generating a preliminary AM half-tone screen divided into a plurality of AM half-tone cells, a pixel-count of each AM half-tone cell being at least 10; b. searching through the AM half-tone screen to locate neighbor pairs of AM half-tone cells defining a pixel-count difference of at least two; c. upon locating a neighbor-pair defining a pixel-count difference of at least two, donating one or more pixels from the larger AM half-tone cell of the neighbor pair to the smaller AM half-tone cell of the neighbor-pair, thereby modifying a border between the between AM half-tone cells of the neighbor pair; d. repeating the pixel-donating of step (c) until all cells of the AM half-tone screen have either N or N+1 pixels; d. defining a set of target positions within the AM halftone screen, the target positions distributed therein according to a blue-noise pattern; e. performing additional pixel-donating operations between AM half-tone cells so as to move all AM half-tone cells having N pixels to the target positions or to move all AM half-tone cells having N+1 pixels to the target positions so that completion of the additional pixel-donating operations yields a final AM half-tone screen; f. applying the final AM half-tone to a multi-level digital to generate an AM-halftoned image; and g. printing the AM half-toned imaged.

In some embodiments, centroids of the preliminary AM half-tone screen are substantially disposed on a perpendicular AM cell grid of uniform spacing.

In some embodiments, steps a-e are performed twice to yield first and second final AM half-tone screens, an angle between a grid-direction of the first AM half-tone screen and a grid-direction of the second AM half-tone screen is between 12 degrees and 18 degrees or between 27 degrees and 33 degrees or between 42 degrees and 48 degrees.

In some embodiments, i. the first AM half-tone screen is applied to a first color-component of a multi-color multi-level image to yield a first AM-halftoned image; ii. the second AM half-tone screen is applied to a second color-component of the multi-color multi-level image to yield a second AM-halftoned image; and iii. the first and second AM-halftone images are printed onto a common target surface respectively by first and second print-bars that are in series with each other.

An AM-halftone-based printing system comprising: a. an ink-jet printing module for printing images on a target surface by depositing droplets thereon; b. electronic circuitry configured to: i. generate a preliminary AM half-tone screen divided into a plurality of AM half-tone cells, a pixel-count of each AM half-tone cell being at least 10; ii. search through the AM half-tone screen to locate neighbor pairs of AM half-tone cells defining a pixel-count difference of at least two; iii. upon locating a neighbor-pair defining a pixel-count difference of at least two, donate one or more pixels from the larger AM half-tone cell of the neighbor pair to the smaller AM half-tone cell of the neighbor-pair, thereby modifying a border between the between AM half-tone cells of the neighbor pair; iv. repeating the pixel-donating until all cells of the AM half-tone screen have either N or N+1 pixels; v. defining a set of target positions within the AM halftone screen, the target positions distributed therein according to a blue-noise pattern; vi. performing additional pixel-donating operations between AM half-tone cells so as to move all AM half-tone cells having N pixels to the target positions or to move all AM half-tone cells having N+1 pixels to the target positions so that completion of the additional pixel-donating operations yields a final AM half-tone screen; vii. applying the final AM half-tone to a multi-level digital to generate an AM-half-toned image; and viii. cause the ink-jet printing module to print the AM half-toned imaged.

An AM-halftone-based printing system comprising: a. an ink-jet printing module for printing images on a target surface by depositing droplets thereon; b. a digital computer comprising a computer memory and one or more processors; and c. a non-transitory computer-readable storage medium containing program instructions, wherein execution of the program instructions by the one or more processors of the digital computer performs all of the following:
  i. generate a preliminary AM half-tone screen divided into a plurality of AM half-tone cells, a pixel-count of each AM half-tone cell being at least 10;
  ii. search through the AM half-tone screen to locate neighbor pairs of AM half-tone cells defining a pixel-count difference of at least two;
  iii. upon locating a neighbor-pair defining a pixel-count difference of at least two, donate one or more pixels from the larger AM half-tone cell of the neighbor pair to the smaller AM half-tone cell of the neighbor-pair, thereby modifying a border between the between AM half-tone cells of the neighbor pair;
  iv. repeating the pixel-donating until all cells of the AM half-tone screen have either N or N+1 pixels;
  v. defining a set of target positions within the AM halftone screen, the target positions distributed therein according to a blue-noise pattern;
  vi. performing additional pixel-donating operations between AM half-tone cells so as to move all AM half-tone cells having N pixels to the target positions or to move all AM half-tone cells having N+1 pixels to the target positions so that completion of the additional pixel-donating operations yields a final AM half-tone screen;
  vii. applying the final AM half-tone to a multi-level digital to generate an AM-halftoned image; amd
  viii. cause the ink-jet printing module to print the AM half-toned image.

A method of printing a multi-level and multi-color digital image, the method comprising: a. respectively applying first and second level AM half-tone screens to first and second multi-level color-components of the multi-level and multi-color input digital image to respectively generate first and second target binary images; and b. respectively print the first and second target binary images by the first and second print-bars respectively using first and second inks onto a common target surface, wherein:
  i. each of the first and second AM half-tone screens has at least 100 levels;
  ii. the first AM half-tone screen is divided into a plurality of AM half-tone cells such that:
    A. each half-tone cell of the first AM half-tone screen is of a first or second type;
    B. AM half-tone cells of the first type each have N pixels;
    C. AM half-tone cells of the second type each have N+1 pixels;
    D. half-tone cells of the first type are distributed within the first half-tone screen according to a blue-noise pattern;
    E. each of the AM half-tone cells of the first half-tone screen has substantially the same common shape;
    F. centroids of the first half-tone screen are disposed on a first perpendicular grid of uniform spacing;
    G. the centroid-grid defines a direction of the first half-tone screen;
  iii. the second AM half-tone screen is divided into a plurality of AM half-tone cells such that:
    A. each half-tone cell of the second AM half-tone screen is of the first or second type;
    B. half-tone cells of the first type are distributed within the second half-tone screen according to a blue-noise pattern;
    C. each of the AM half-tone cells of the second half-tone screen has substantially the same common shape;
    D. centroids of the second half-tone screen are disposed on a second perpendicular grid having the same uniform spacing as the first perpendicular grid of the first half-tone screen; and
    E. an angle between a grid-direction of the first perpendicular grid and a grid-direction of the second perpendicular grid is between 12 degrees and 18 degrees or between 27 degrees and 33 degrees or between 42 degrees and 48 degrees.

A printing system for printing a multi-level and multi-color digital image, the system comprising: a. a plurality of print-bars, each print-bar comprising or holding a plurality of ink-jet nozzles for printing print-bar-specific ink-jet image in a respective print-bar-specific color onto a target surface; b. electronic circuitry for: i. respectively applying first and second level AM half-tone screens to first and second multi-level color-components of the multi-level and multi-color input digital image to respectively generate first and second target binary images; and ii. respectively cause the first and second print-bars to print the first and second target binary images respectively using first and second inks onto a common target surface, wherein: iii. each of the first and second AM half-tone screens has at least 100 levels; iv. the first AM half-tone screen is divided into a plurality of AM half-tone cells such that: A. each half-tone cell of the first AM half-tone screen is of a first or second type; B. AM half-tone cells of the first type each have N pixels; C. AM half-tone cells of the second type each have N+1 pixels; D. half-tone cells of the first type are distributed within the first half-tone screen according to a blue-noise pattern; E. each of the AM half-tone cells of the first half-tone screen has substantially the same common shape; F. centroids of the first half-tone screen are disposed on a first perpendicular grid of uniform spacing; G. the centroid-grid defines a direction of the first half-tone screen; v. the second AM half-tone screen is divided into a plurality of AM half-tone cells such that: A. each half-tone cell of the second AM half-tone screen is of the first or second type; B. half-tone cells of the first type are distributed within the second half-tone screen according to a blue-noise pattern; C. each of the AM half-tone cells of the second half-tone screen has substantially the same common shape; D. centroids of the second half-tone screen are disposed on a second perpendicular grid having the same uniform spacing as the first perpendicular grid of the first half-tone screen; E. an angle between a grid-direction of the first perpendicular grid and a grid-direction of the second perpendicular grid is between 12 degrees and 18 degrees or between 27 degrees and 33 degrees or between 42 degrees and 48 degrees.

BRIEF DESCRIPTION OF THE DRAWINGS

FIG. 1A illustrates a rosette pattern of four inks of different colors (PRIOR ART).

FIG. 1B illustrates how accuracy of the rotation angle is limited by print resolution (PRIOR ART).

FIG. 1C shows one example of a supercell (PRIOR ART).

FIG. 2A illustrates an AM-half-toning supercell made up of four AM halftone cells.

FIG. 3A illustrates a printing system where ink images are formed (e.g. by deposition of droplets of ink) at an image forming station (e.g. ink-jet based) on the surface of an intermediate transfer member (ITM) (PRIOR ART).

FIG. 8D shows the 'grid scheme' of the AM half-tone cells on the two-dimensional perpendicular grid.

FIG. 13 shows a situation before (left-hand-side) and after (right-hand-side) step S217 is performed.

DETAILED DESCRIPTION OF EMBODIMENTS

Figure 2B:
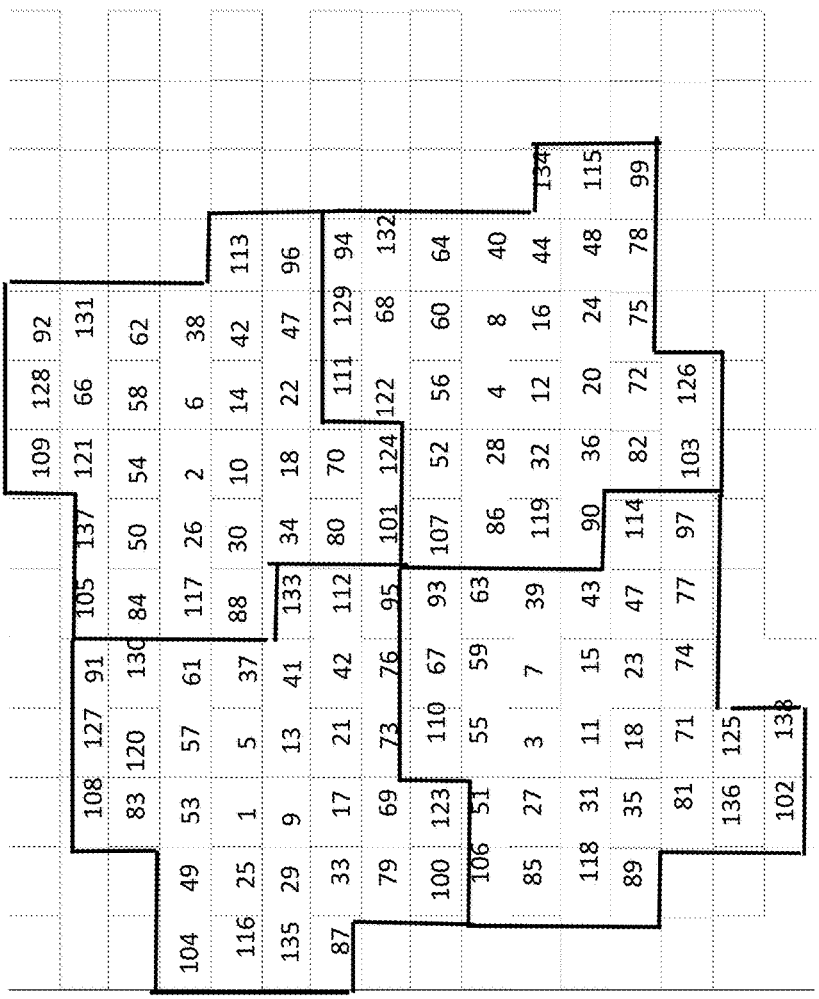
FIG. 2B relates to the example where there are 138 halftone levels
Figure 3B:
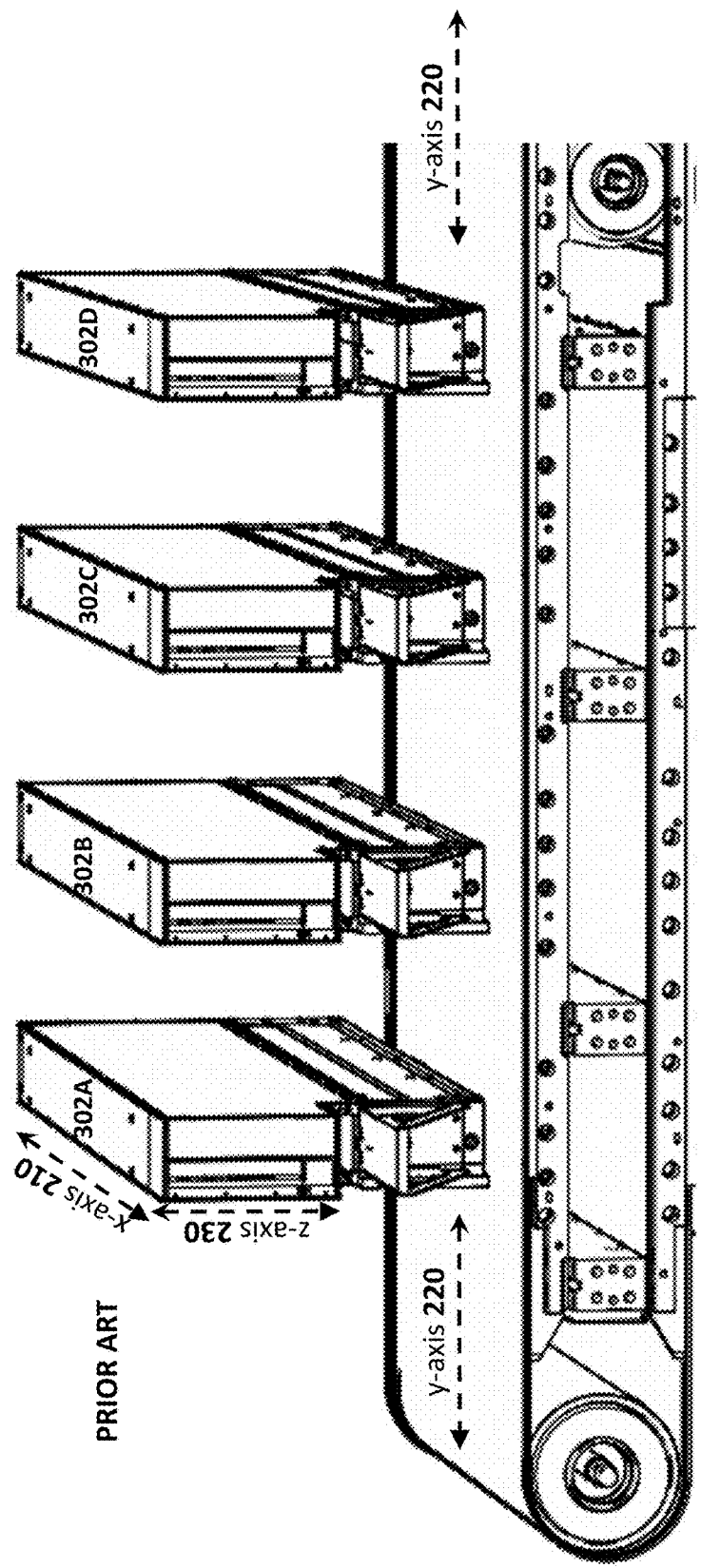
FIG. 3B illustrates the one or more print-bars.
Figure 4:
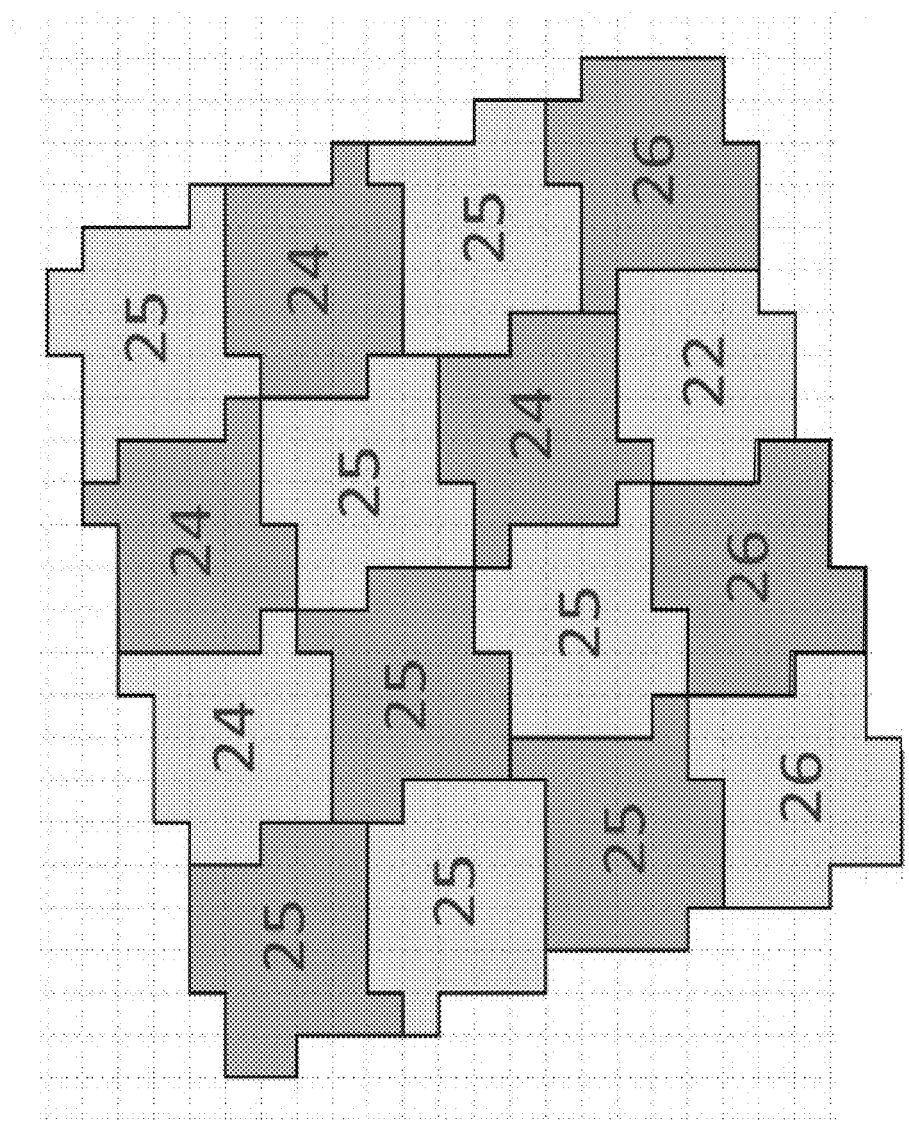
FIGS. 4 and 7A-7B each show one example of a portion of an AM half-tone screen of 16 half-tone cells.

A downside of conventional supercells relates to the discrete nature of the printer's dot grid. In particular, rounding errors in the division of the supercell cause sub-cells to differ in the number of pixels that comprise them. When printing a uniform gray level, the number of dots printed in each sub-cell will be different, creating an objectionable texture. This is shown in FIG. 4 where a sub-cell having 22 pixels is bordered (i.e. on opposite sides) by two sub-cells that each have 26 pixels.

Embodiments of the invention relate to techniques for reducing or eliminating this objectionable texture.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage. For the present disclosure "electronic circuitry" is intended broadly to describe any combination of hardware, software and/or firmware.

Electronic circuitry may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

In various embodiments, an ink image is first deposited on a surface of an intermediate transfer member (ITM), and transferred from the surface of the intermediate transfer member to a substrate (i.e. sheet substrate or web substrate). For the present disclosure, the terms "intermediate transfer member", "image transfer member" and "ITM" are synonymous, and may be used interchangeably. The location at which the ink is deposited on the ITM is referred to as the "image forming station".

For the present disclosure, the terms "substrate transport system" and "substrate handling system" are used synonymously, and refer to the mechanical systems for moving a substrate from an input stack or roll to an output stack or roll.

"Indirect" printing systems or indirect printers include an intermediate transfer member. One example of an indirect printer is a digital press. Another example is an offset printer.

Embodiments of the present invention relate to methods and apparatus for generating AM screens (e.g. by a digital computer) and for methods and apparatus for printing using the generated AM screens.

Figure 5:
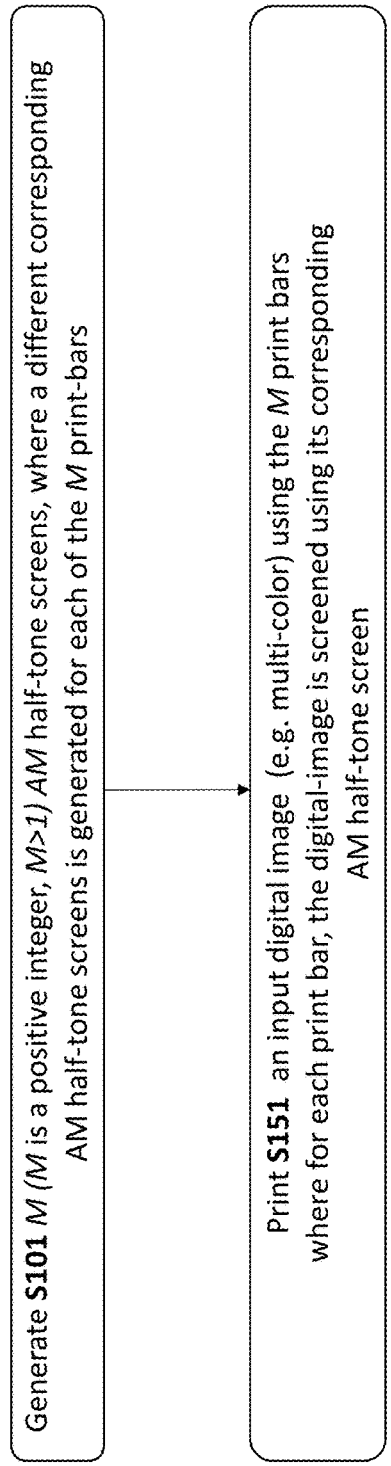
FIG. 5 is a flow chart of a method for generating and applying AM screens in a system comprising M print bars.

FIG. 5 is a flow chart of a method for generating and applying AM screens in a system comprising M print bars.

In step S101, a plurality of AM half-tone screens AMS[1], . . . AMS[M] are generated, where a different half-tone screen is corresponds to each print bar of a plurality of print bars. Thus, AM half-tone screen AMS[1] corresponds to print bar PB[1], AM half-tone screen AMS [2] corresponds to print bar PB[2], and so on.

In step S151, a color digital image is printed by the plurality of print-bars to form a color ink image on a target surface. For each print bar PB[i] (i is a positive integer between 1 and M), the digital-image is screened using its corresponding AM half-tone screen AMS[i]. The digital image is subjected to screening by the first AM screen AMS[1] and printed by the first print bar PB[1], subjected to screening by the second AM screen AMS[2] and printed by the second print bar PB[2], and so on.

Figure 6:
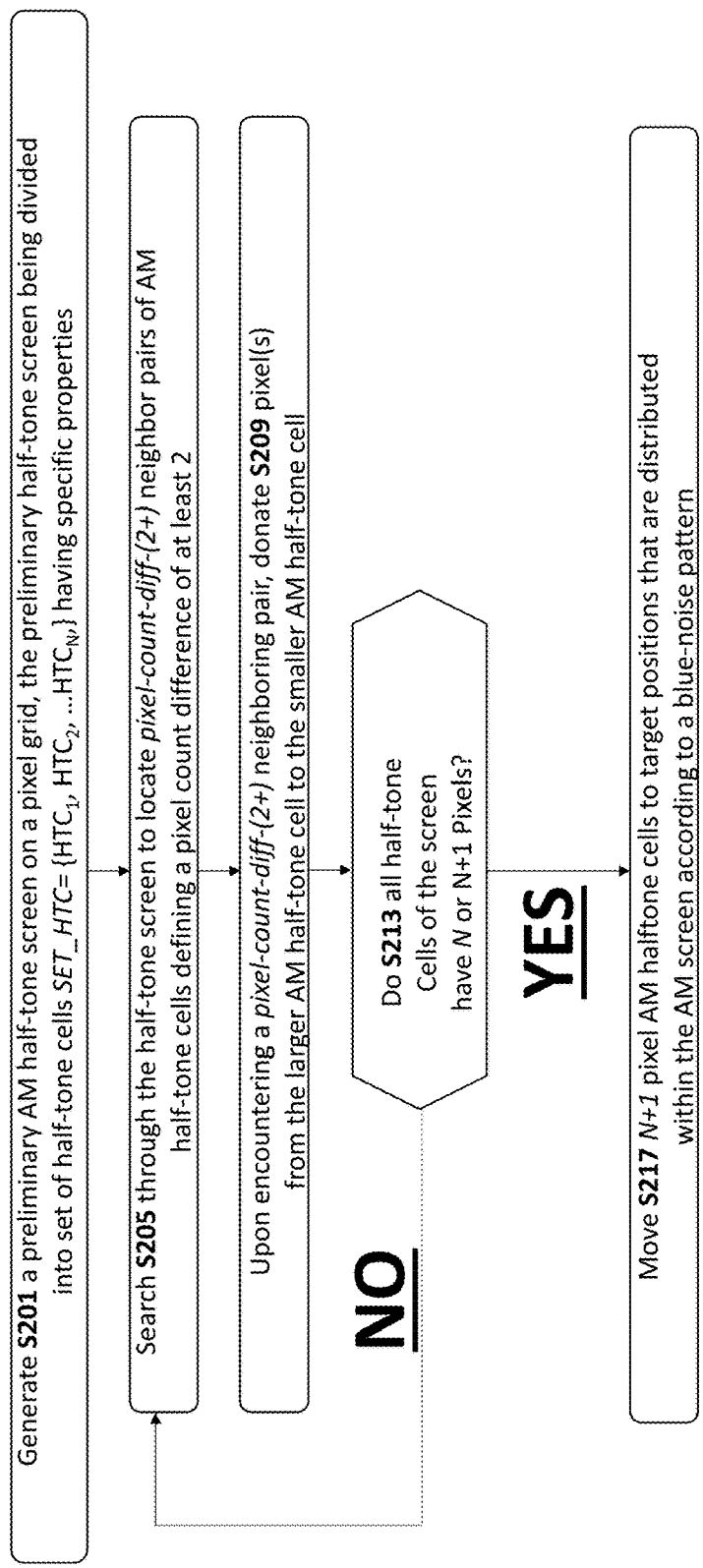
FIG. 6 is a flow chart of a method for generating a single AM half-tone screen on a pixel grid.

FIG. 6 is a flow chart of a method for generating a single AM half-tone screen on a pixel grid. This method is now explained with reference to FIGS. 7A-7B, 8A-8D, 9A-9B, 10, 11A-11B, 12A-12B, 13, and 14A-14B.

A Discussion of Step S201 of FIG. 6

Figure 7A:
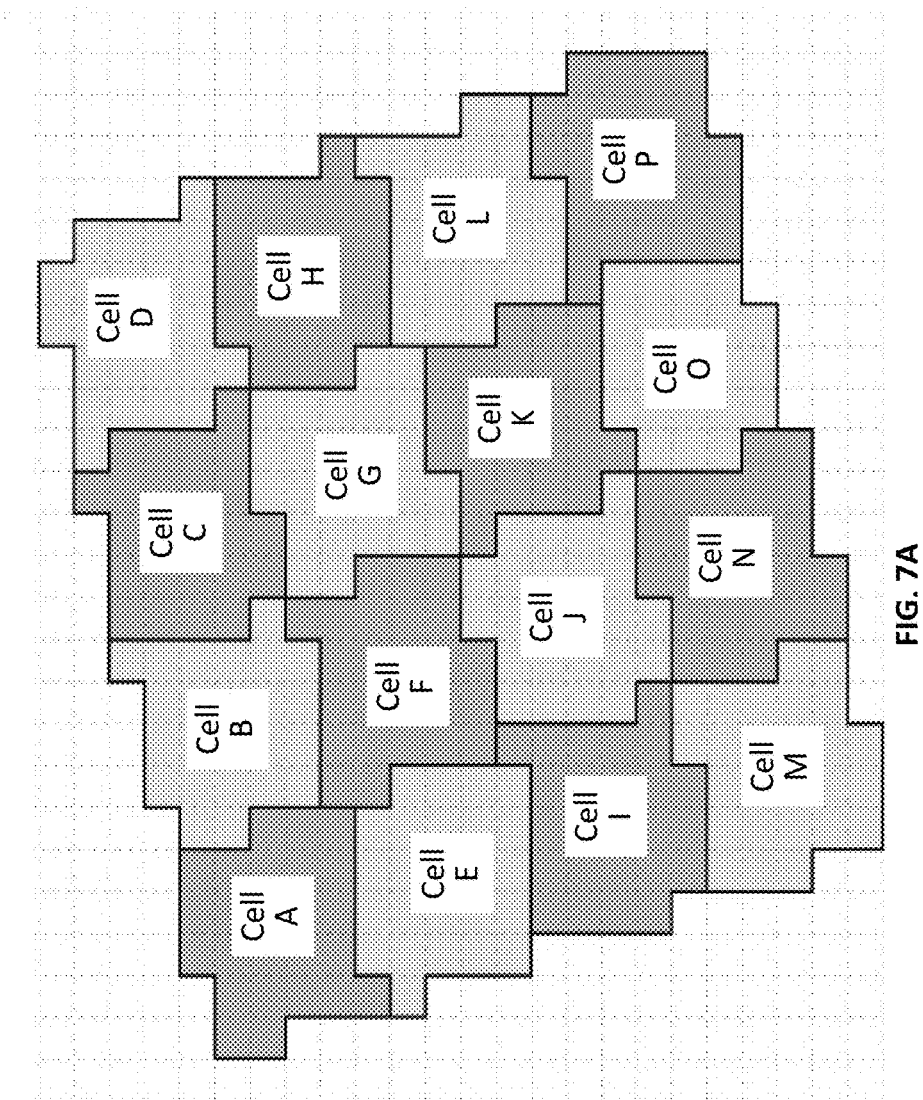
Figure 7B:
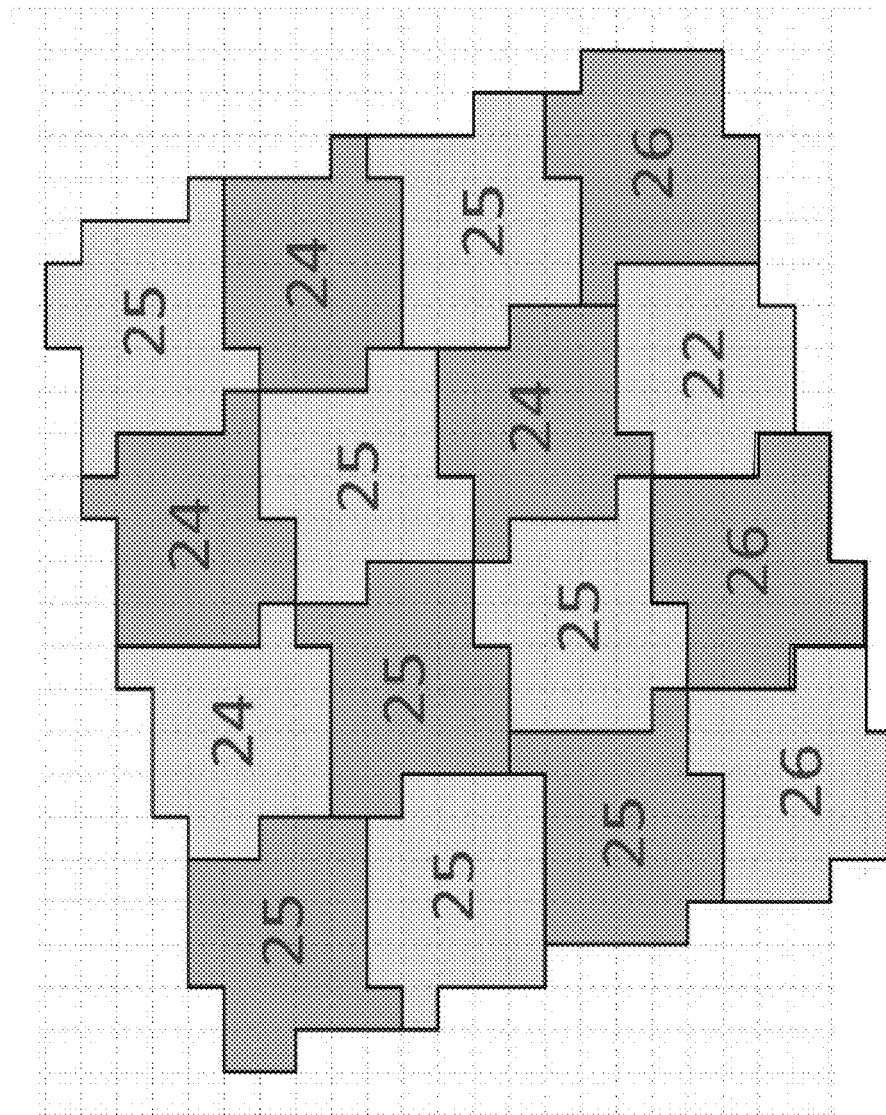

In step S201, an initial AM half-tone screen divided into AM half-tone cells is generated. One example of a portion of an AM half-tone screen of 16 half-tone cells, labelled cells A-P is shown in FIG. 7A. The pixel count of each cell is shown in FIG. 7B.

In particular, a set of AM half tone cells SET_HTC={$HTC_1 \ldots HTC_2 \ldots HTC_N$} is generated where N is positive integer (e.g. N>10 or N>25 or N>50 or N>100). This set of half-tone AM halftone cells characterizing the initial AM half-tone screen may have one or more (i.e. any combination of—e.g. all of) the following properties:

(i) Property A—A pixel-count (i.e. defining a cell size) of each AM half-tone cell is at least 10 or at least 15 or at least 20;

(ii) Property B—pixel counts of the half-tone cells are substantially the same;

(iii) Property C—respective centroids of the half-tone cells are distributed on a rectangular grid—see the discussion below with reference to FIGS. 5A-5B and 6A-6B;

(iv) Property D—each of the AM half-tone cells has substantially the same shape—see the discussion below with reference to FIGS. 5A-5B and 6A-6B;

Property B—each AM half-tone cell is characterized by a pixel count. Thus, in the example of FIG. 7A-7B, a pixel count of cell A is 25, a pixel count of cell B is 24, and so on. An AM half-tone screen is characterized by the set of AM half tone cells SET_HTC={$HTC_1, HTC_{12} \ldots HTC_N$}. Each half-tone cell has a 'pixel count'—thus, an AM half-tone screen has a set of pixel counts (i.e. a set of integers) Set_of_Pixel_Counts={$PC(HTC_1), PC(HTC_2) \ldots PC(HTC_N)$}. The 'average pixel count' of the AM half tone screen is $$AVG(\text{Set\_of\_Pixel\_Counts}) = \frac{\sum_{i=1}^{N} PC(HTC_i)}{N}$$

where $PC(HTC_i)$ is the pixel count of the $i^{th}$ half-tone cell $HTC_i$. The standard deviation of the AM half tone screen may similarly be defined as SD(Set_of_Pixel_Count).

In some embodiments, a ratio between SD(Set_of_Pixel_Counts) and AVG(Set_of_Pixel_Counts) is at most 0.3 or at most 0.2 or at most 0.1 or at mots 0.05.

Figure 8A:
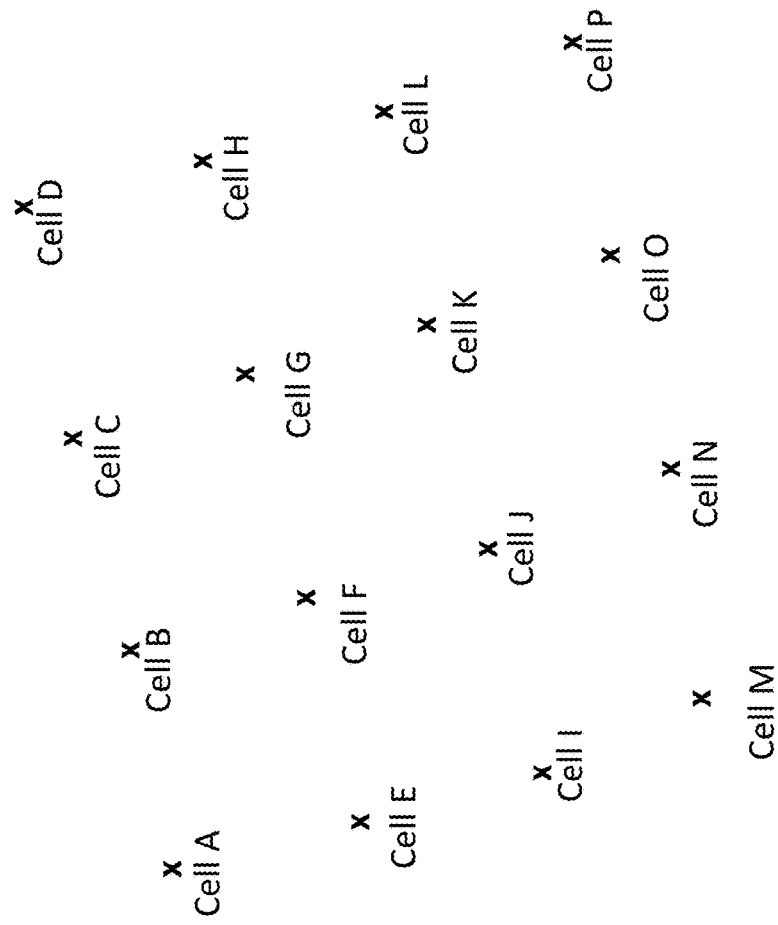
FIG. 8A shows centroids of AM Halftone.
Figure 8B:
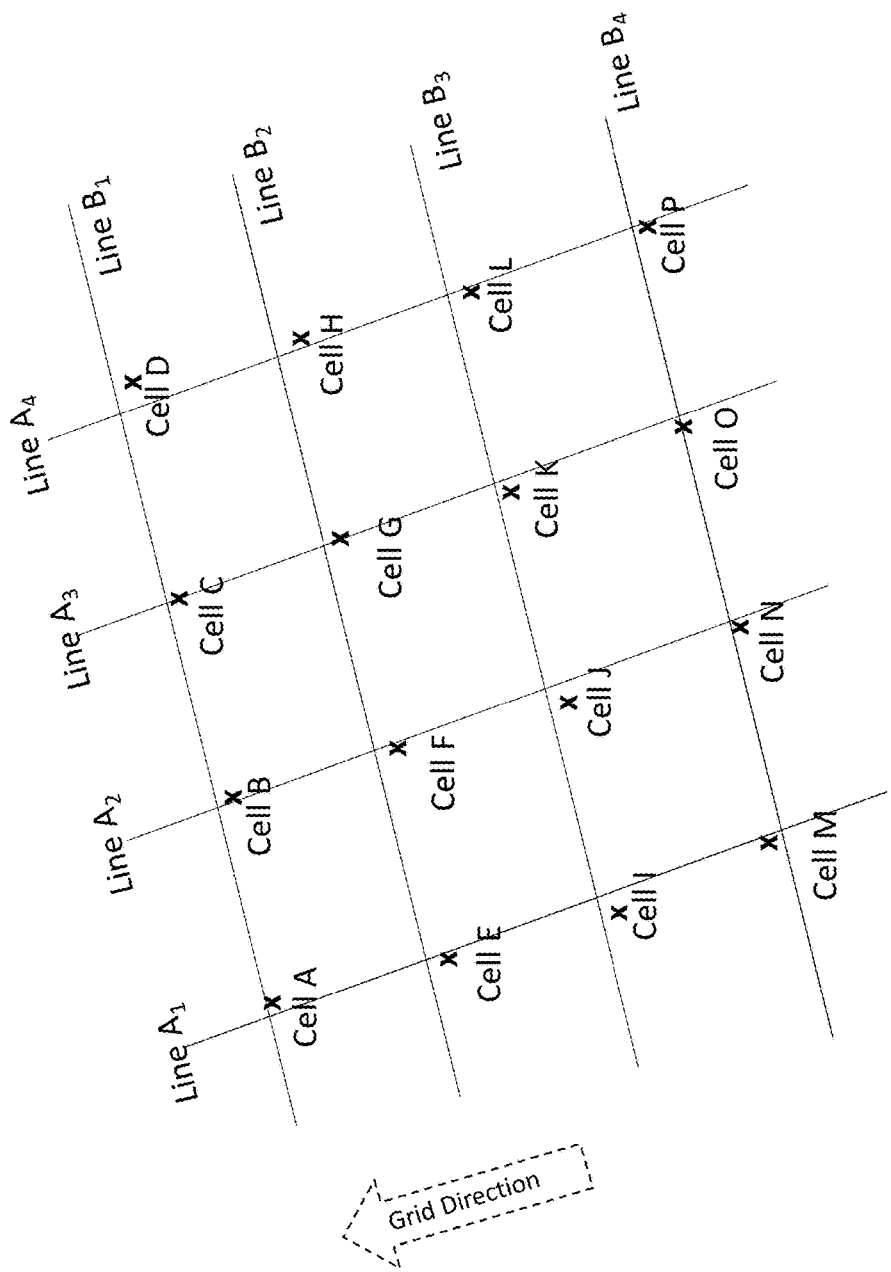
FIG. 8B shows two sets of parallel lines defining the rectangular grid.
Figure 8C:
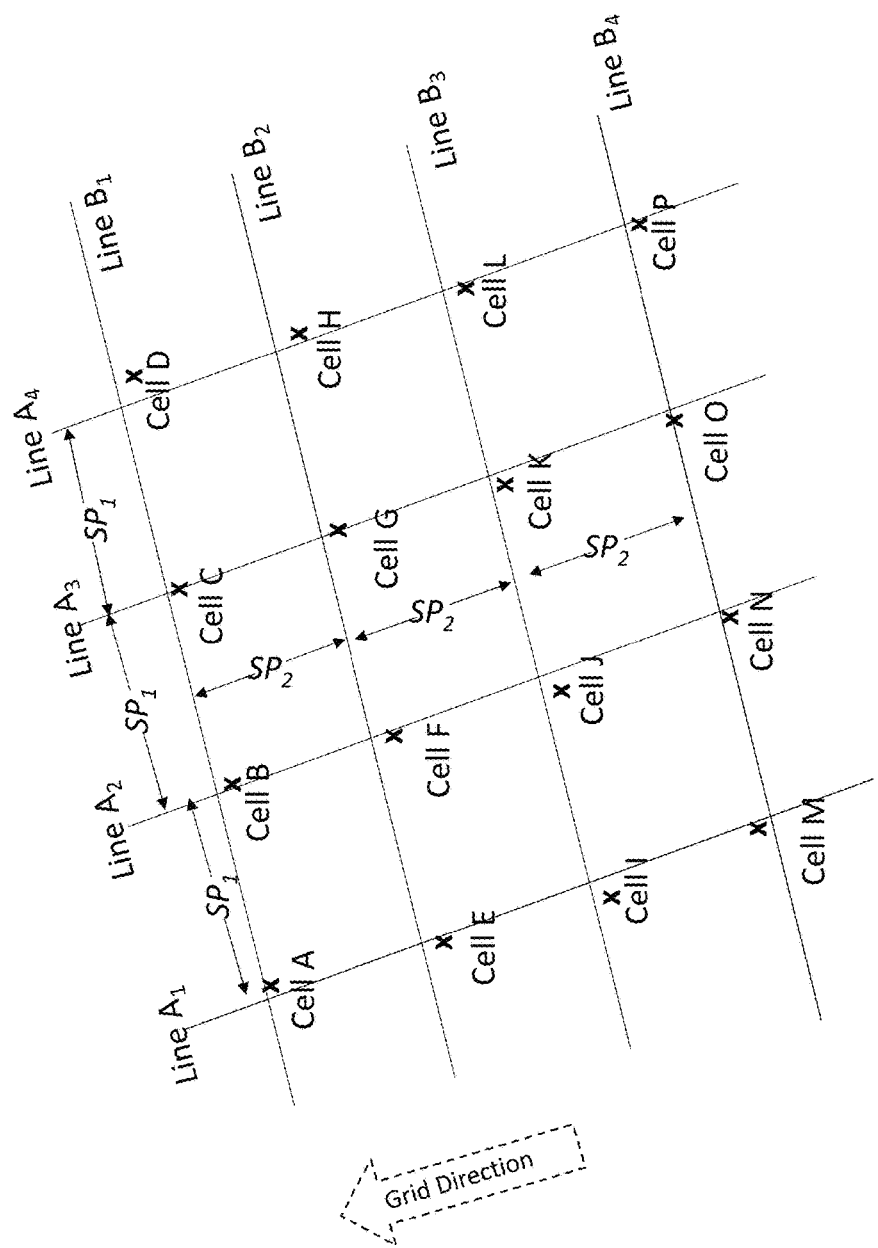
FIG. 8C shows spacing values $SP_1$ and $SP_2$.

Property C—the respective centroids of the half-tone cells are substantially distributed on a rectangular grid. FIG. 8A shows centroids of AM Halftone cells A-P, each marked with an 'X.' FIG. 8B shows two sets of parallel lines defining the rectangular grid—(i) a first set of 'A" lines (A1-A4 are illustrated) that are parallel to each other, distanced from each other at a first uniform spacing $SP_1$ and (ii) a second set of 'B' lines that are parallel to each other and perpendicular to the 'A' lines (B1-B4 are illustrated)—lines of the second set are spaced from each other at a second uniform spacing $SP_2$. The spacing values $SP_1$ and $SP_2$ are shown in FIG. 8C.

Thus, salient features of the grid of FIGS. 8A-8E are (i) uniformed-spacing; and (ii) the grid is a perpendicular grid. Each half-tone cell centroid is disposed on the nodes of the rectangular grid, defined by the intersections of the lines with each other. The skilled artisan experienced in the art of AM half-toning will appreciate that as shown in the drawings, the half-tone cell centroids are not required to be located exactly on each grid-node in order for the half-tone cell centroids to be disposed 'on the grid.'

Figure 9A:
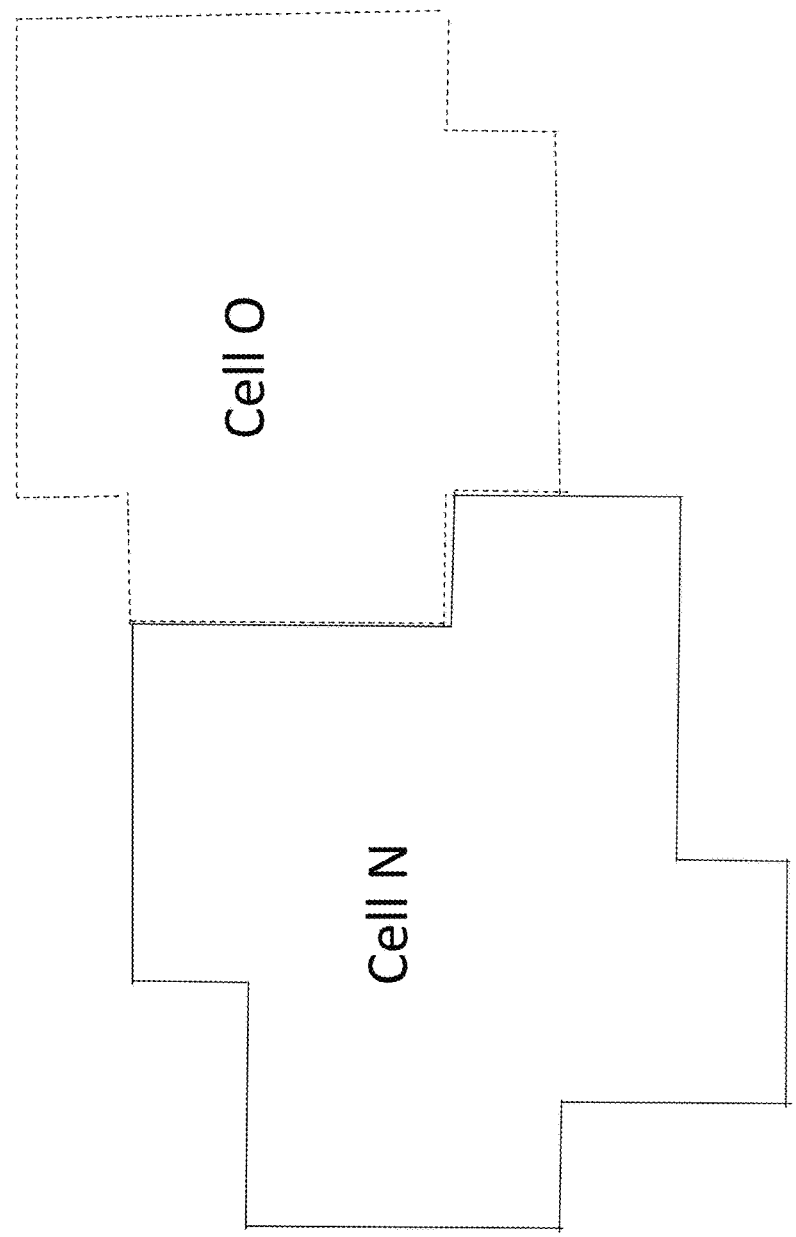
FIG. 9A is a close-up of half-tone cells "N" or "O" from the example of FIG. 7A.

Property D—the half-tone cells have substantially the same shape. FIG. 9A is a close-up of half-tone cells "N" or "O" from the example of FIG. 7A.

Figure 9B:
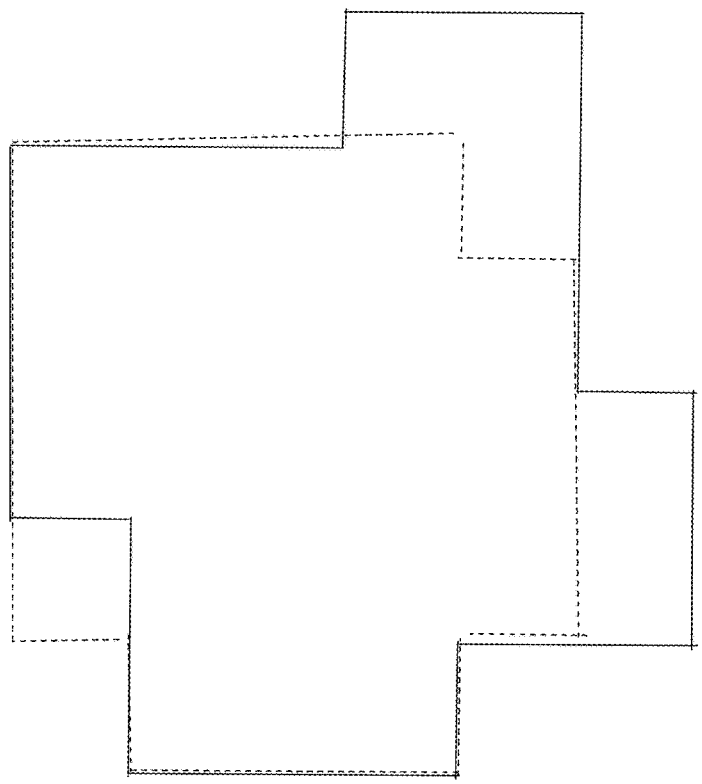
FIG. 9B shows half-tone cells "N' and "O" as superimposed upon each other.

In FIG. 9B, half-tone cells "N' and "O" are superimposed upon each other.

As shown in FIG. 9B, when half tone cells "N" and "O" are superimposed upon each other, at least 80% of half-tone cell "N" is contained in half-tone cell "O" and at least 80% of half-tone cell "O" is contained in half-tone cell "N".

Thus, if a half-tone screen is characterized by half-tone cells of 'substantially the same shape' (i.e. all cells of SET_HTC={$HTC_1, HTC_2 \ldots HTC_N$} have substantially the same shape), then for any two half-tone cells $HTC_i$ and $HTC_j$, (where i≠j), when superimposed upon each other, at least 80% of the first half tone cell $HTC_i$, is contained within the second half tone cell $HTC_j$, and at least 80% of the second half tone cell $HTC_j$ is contained within the first half tone cell $HTC_i$.

Neighboring Cells

The term 'neighboring cells' is synonymous with 'grid-neighboring' cells. Thus, the centroid of each cell is placed upon a two-dimensional perpendicular grid, as in FIGS. 7A-7B and 8A-8B. FIG. 8D shows the 'grid scheme' of the AM half-tone cells on the two-dimensional perpendicular grid—a representation of each cell is placed within a rectangle, as shown in FIG. 8D.

Two cells are 'neighbors' if and only if (i) the two cells share a common border and (ii) in the grid scheme defined by centroids of the AM half-toning cells placed within rectangles, the two centroids of the cells (i.e. as placed on the grid) are connected by vertical or horizontal (i.e. not a diagonal) line.

Thus, cells A and B are neighbors. Cells A and F are not neighbors—even though they share a common border (see FIG. 7A), in the grid scheme of FIG. 8D they are only connected by a diagonal line.

When two cells are neighboring cells, they define a 'neighbor pair' of cells.

Pixel Count of a Cell and 'Pixel Count Difference' of Neighboring Cells—Every AM halftone cell in the halftone cell grid has a number of pixels—this is the 'pixel count.' Thus, in FIGS. 7A-7B, the 'pixel count' of Cell 'A' is 25, the 'pixel count' of Cells 'B' and 'C' is 24, and so on.

Every neighbor pair has two cells—a first cell and a second cell of the neighbor pair. A 'pixel count difference' of a neighbor pair is defined as the absolute value of the difference between (i) the pixel count of the first cell and (ii) the pixel count of the second cell.

For the neighbor pair defined by Cells 'A' and 'B' the pixel count of the neighbor pair is |Pixel Count (Cell A)–Pixel Count (Cell B)|=|25–24|=1.

For the neighbor pair defined by Cells 'B' and 'C' the pixel count of the neighbor pair is |Pixel Count (Cell B)–Pixel Count (Cell C)|=|24–24|=0.

For the neighbor pair defined by Cells 'C' and 'D' the pixel count of the neighbor pair is |Pixel Count (Cell C)–Pixel Count (Cell D)|=|24–25|=1.

For the neighbor pair defined by Cells 'K' and 'O' the pixel count of the neighbor pair is |Pixel Count (Cell K)–Pixel Count (Cell O)|=|24–22|=2.

Steps S205-S217, discussed below, modify the preliminary AM half-tone screen to generate a 'final' AM half-tone screen from the preliminary AM half-tone screen. The 'final' half-tone screen may have, one or more (i.e. any combination of—e.g. all of) properties A-D discussed above.

A Discussion of Steps S205-213 of FIG. 6

Reference is made, once again to FIG. 6. In step S205, the half-tone screen is search to locate neighbor pairs where a pixel count difference pixel-count-duff between the larger cell and the smaller cell is two or more. This is referred to as a pixel-count-diff-(2+) neighbor pair, where 2+ is an abbreviation for two or more.

Examples of such neighbor pairs in FIG. 7B are: (Cell K, Cell O), (Cell N, Cell O) and (Cell O, Cell P).

Figure 10:
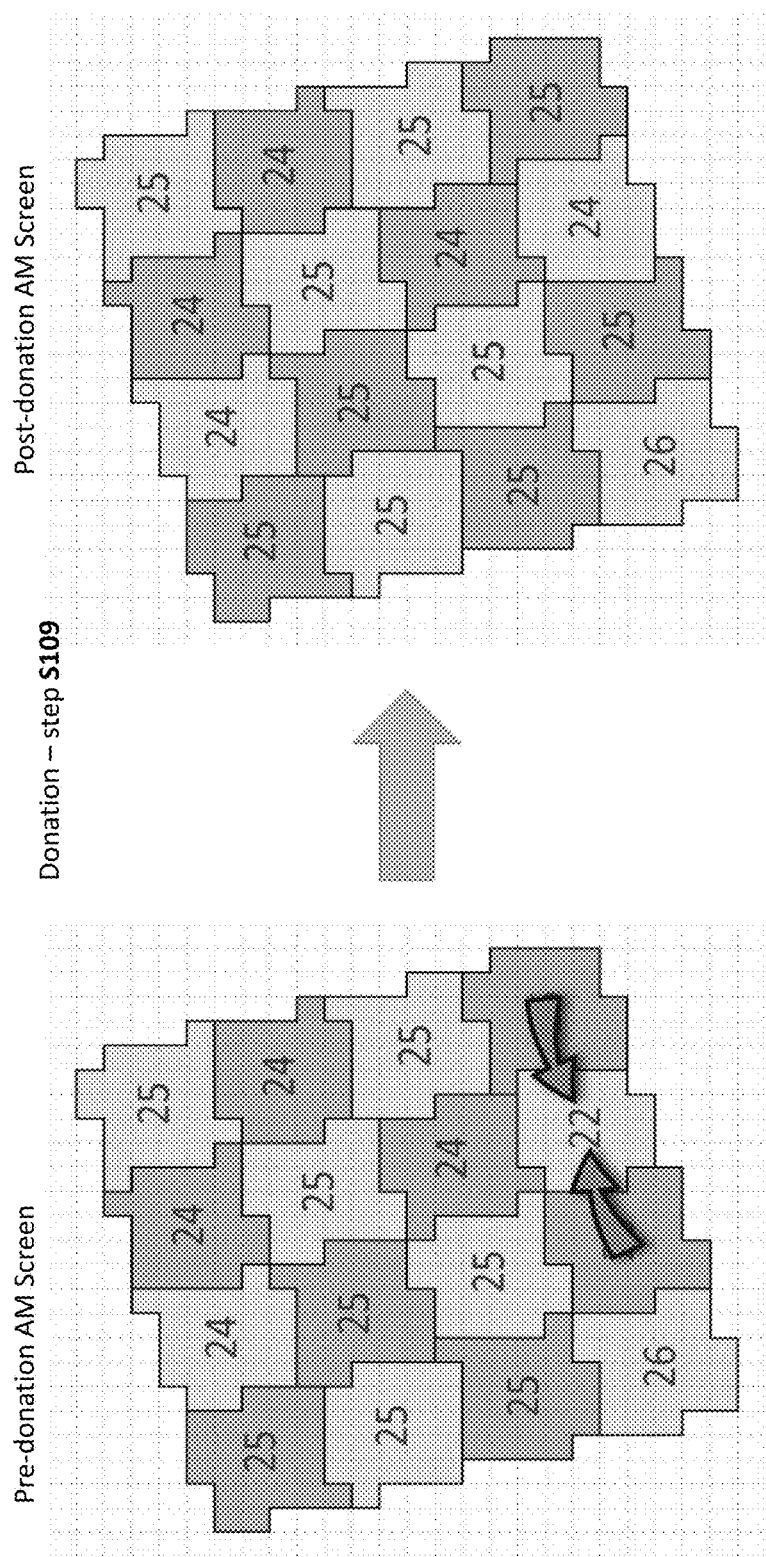
FIG. 10 shows an example where (i) one pixel is donated from cell N to cell O and (ii) one pixel is donated from cell P to cell O.

In step S209, upon encountering a pixel-count-duff-(2+) neighbor pair, pixel(s) are donated from the larger (i.e. having more pixels) cell of the neighbor pair to the smaller (i.e. having fewer pixels) cell of the neighbor pair. FIG. 10 shows an example where (i) one pixel is donated from cell N to cell O, decreasing the pixel-count of cell of cell N by one and increasing the pixel-count of cell of cell O by one; and (ii) one pixel is donated from cell P to cell O, decreasing the pixel-count of cell of cell P by one and increasing the pixel-count of cell of cell O by one.

Figure 11A:
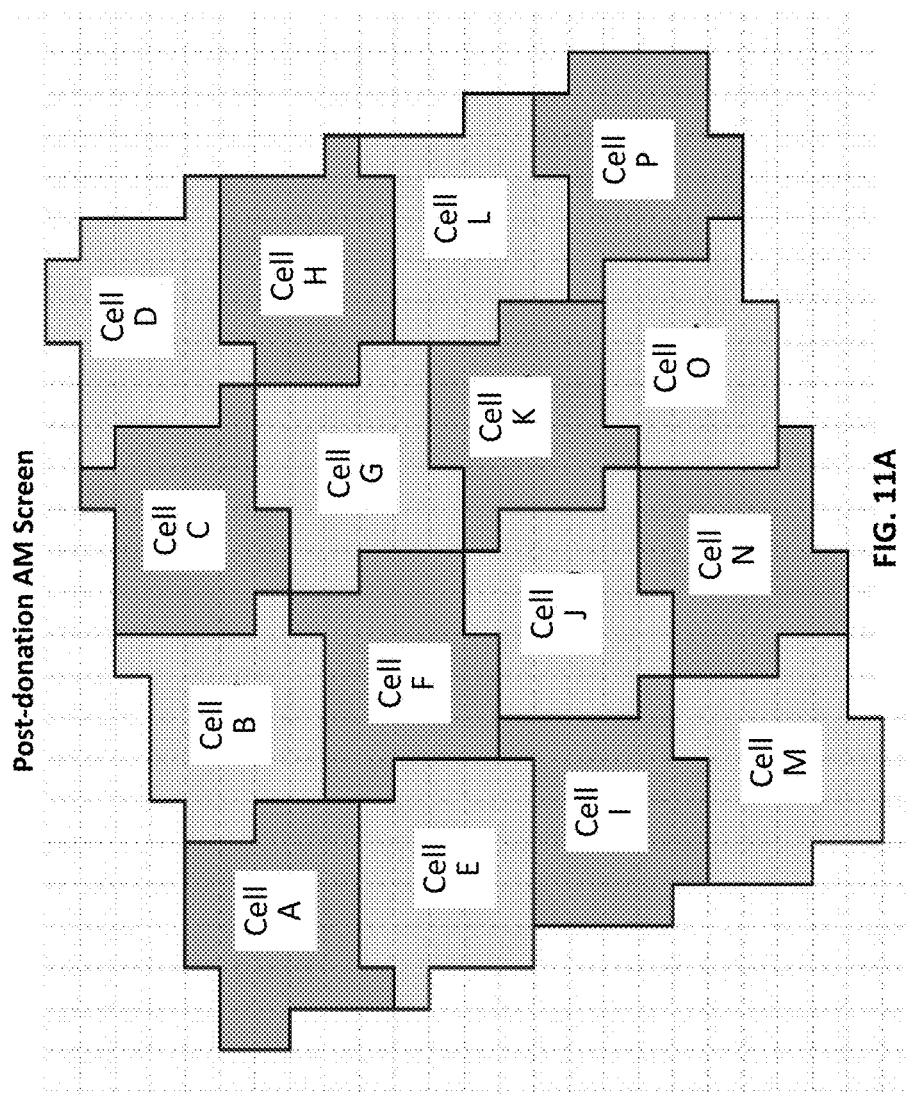
FIGS. 11A-11B show the post-donation AM screen.
Figure 11B:
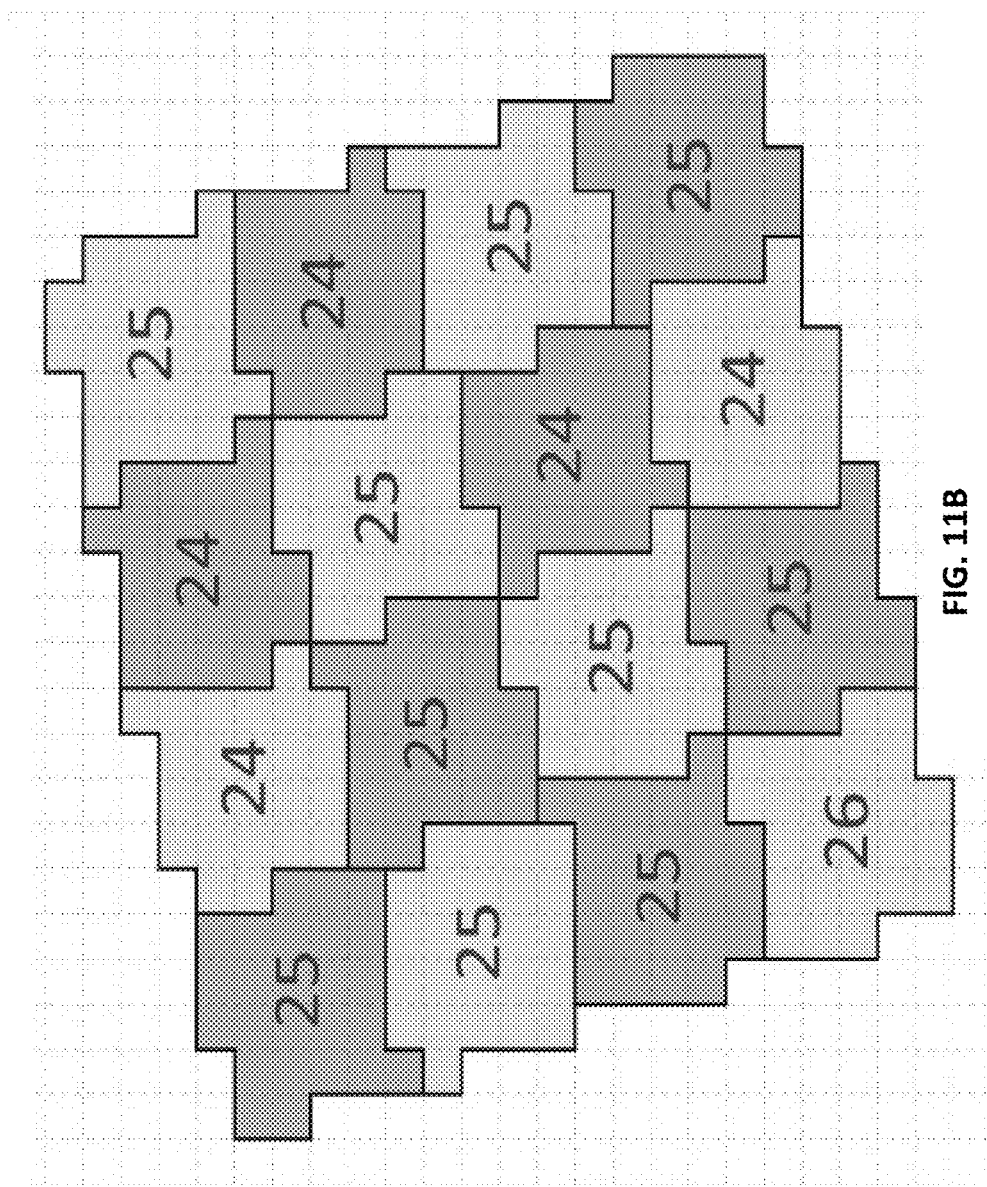

It possible to compare FIGS. 7A-7B which show the pre-donation AM screen (i.e. before the pixel donation of FIG. 10) to FIGS. 11A-11B which show the post-donation AM screen (i.e. after the pixel donation of FIG. 10).

Figure 12A:
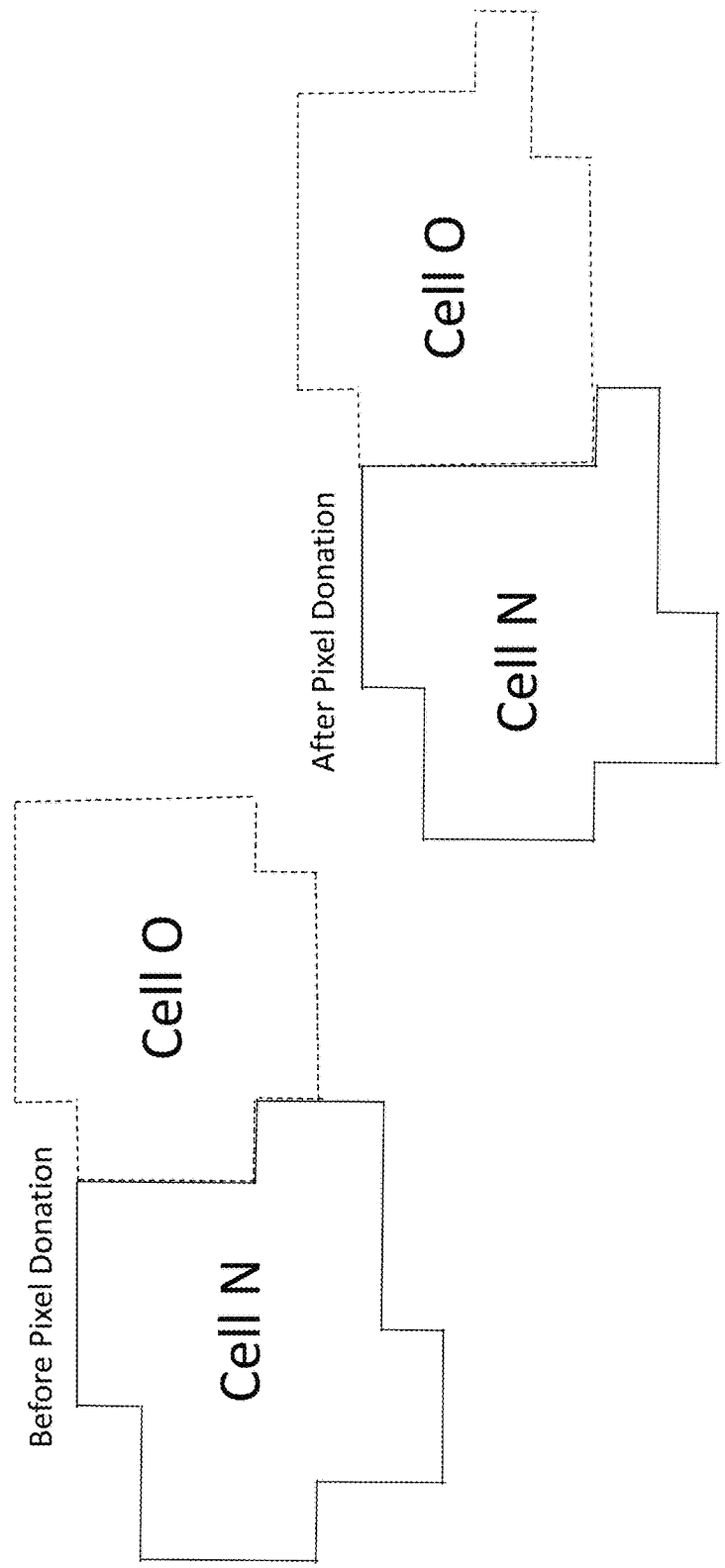
FIG. 12A shows the pre-donation dimensions of Cells N and O.
Figure 12B:
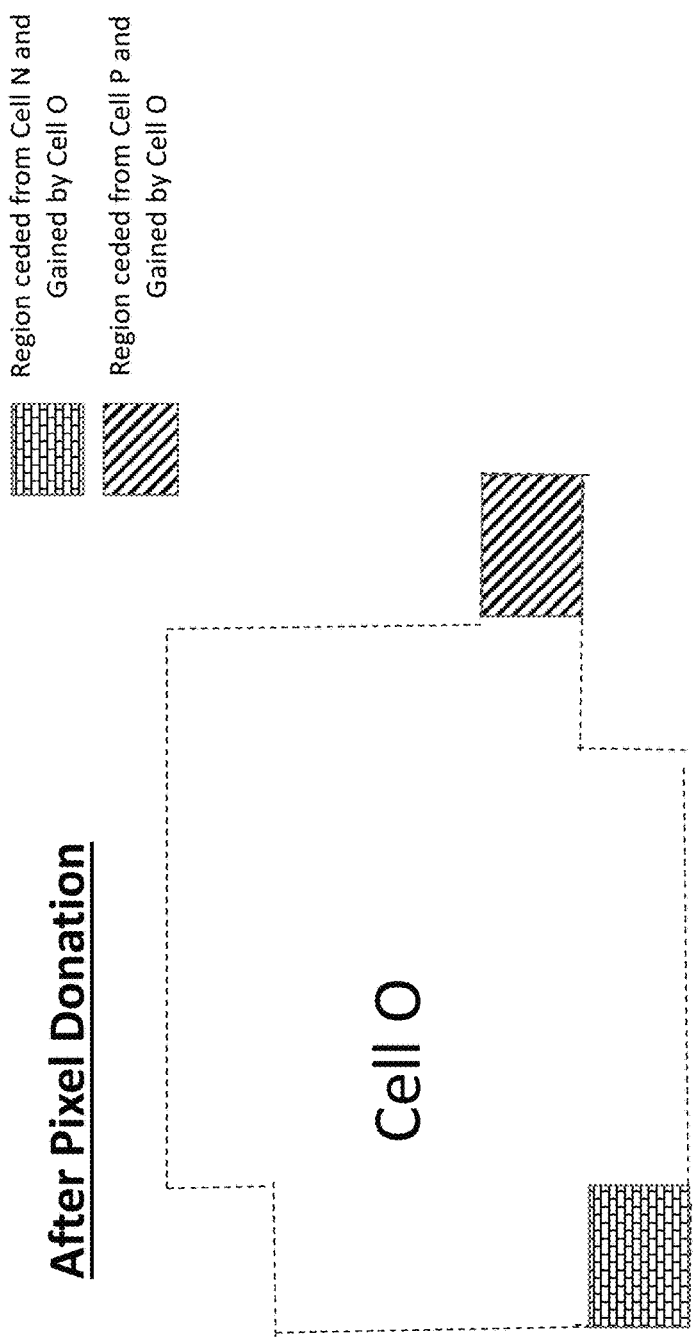
FIG. 12B shows the growth of Cell O as a result of donation of pixels from Cells N and P.

FIG. 12A show the pre-donation dimensions of Cells N and O (LEFT SIDE of FIG. 12A) and the post-donation dimensions of Cells N and O (RIGHT SIDE of FIG. 12A). FIG. 12B shows the growth of Cell O as a result of donation of pixels from Cells N and P.

As shown in step S213 of FIG. 6, steps S205 and S209 are repeated until all half-tone cells of the AM half-tone screen have N or N+1 pixels—i.e. until there are no neighbor pairs defining a pixel count difference of two or more.

A Discussion of Steps S217 of FIG. 6

Reference is made to FIG. 13 which illustrates one example of step S217 of FIG. 7. In FIG. 13, locations of half-tone cells having a pixel count of "N+1" are shown in dark, and locations of half-tone cells having a pixel count of "N" are shown in light. The left hand side of FIG. 13 relates to the situation before step S217 is performed and the right hand side of FIG. 13 relates to the situation after step S217 is performed.

In step S217, the AM half-tone cells having a pixel count of "N+1" are moved to locations that are distributed in the AM half-tone screen according to a blue-noise pattern.

Towards this end, it is possible first to generate a plurality of 'target locations' that are distributed in the AM half-tone screen according to a blue-noise pattern. Subsequently, each half-tone cell having a pixel count of N+1 (i.e. a N+1 pixel half-tone cell) is moved to one of the target locations. One example of moving a cell is shown in FIGS. 14A-14B where 16 AM halftone cells AA-AI (i.e. a portion of an AM screen) are shown only schematically and no attempt is made to show their shape.

State 'A" represents the AM screen portion immediately after step S213 and before step S217 begins. Moving steps 1-4 of are performed as part of step S217.

In this example, immediately after completing step S213 all AM half-tone cells have either 24 pixels or 25 pixels. In 'state A' 15 of the 16 AM halftone cells have 24 pixels and one (upper left side) has 25 pixels. The 'target locations' are then computed to have the blue-noise pattern (i.e. separation distances between the target locations are characterized by a blue noise patterns).

Figure 14A:
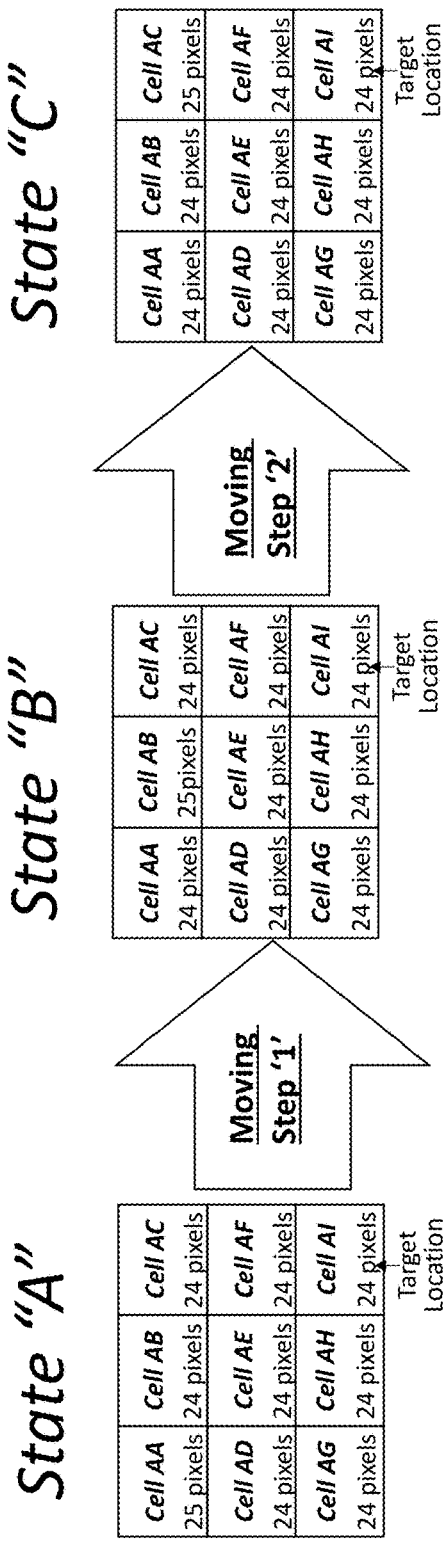
FIGS. 14A-14B show one example of moving a cell.
Figure 14B:
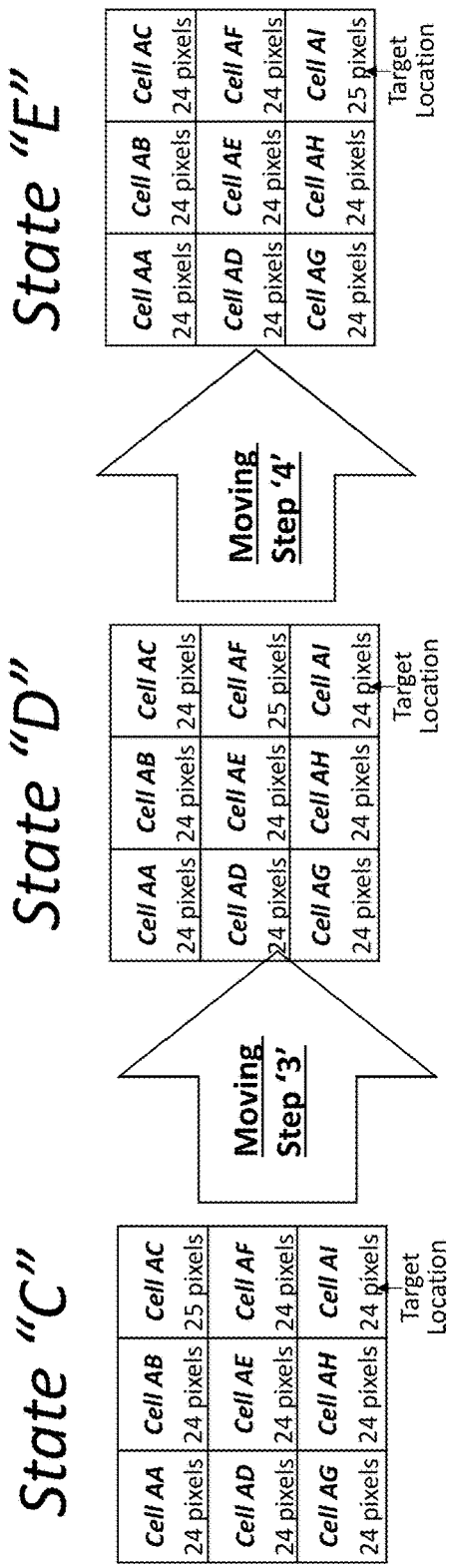

In FIGS. 14A-14B, one of the '25 pixel' cells is moved from its initial location (top left) to the target location (bottom right).

In 'moving step 1,' cell AA donates a single pixel to cell AB to modify a shape of the cells AA and cells AB—the result is 'state 'B'. Pixel donation may be performed as described above.

In 'moving step 2,' cell AB donates a single pixel to cell AC to modify a shape of the cells AB and cells AC—the result is 'state 'C'.

In 'moving step 3,' cell AC donates a single pixel to cell AF to modify a shape of the cells AC and cells AF—the result is 'state 'D'.

In 'moving step 4,' cell AF donates a single pixel to cell AI to modify a shape of the cells AF and cells AI—the result is 'state 'D'.

FIGS. 14A-14B show an example of relocation a single N+1 pixel cell to a single target location—this may be repeated until all N+1 pixel cells are moved to the target locations (i.e. distributed according to the blue noise pattern).

The skilled artisan will appreciate that, alternatively, instead of moving N+1 pixel cells, all N pixel cells may be moved to the 'blue-noise-distributed' target locations.

Concluding Remarks

Unless otherwise stated, the use of the expression "and/or" between the last two members of a list of options for selection indicates that a selection of one or more of the listed options is appropriate and may be made.

In the discussion, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

Where applicable, although state diagrams, flow diagrams or both may be used to describe embodiments, the technique is not limited to those diagrams or to the corresponding descriptions. For example, flow need not move through each illustrated box or state, or in exactly the same order as illustrated and described While this disclosure has been described in terms of certain embodiments and generally associated methods, alterations and permutations of the embodiments and methods will be apparent to those skilled in the art. The disclosure of the invention is to be understood as not limited by the specific embodiments described herein, but only by the scope of the appended claims.

What is claimed is:

1. An AM-halftone-based printing method comprising:
   a. generating a preliminary AM half-tone screen divided into a plurality of AM half-tone cells, a pixel-count of each AM half-tone cell being at least 10;
   b. searching through the AM half-tone screen to locate neighbor pairs of AM half-tone cells defining a pixel-count difference of at least two;
   c. upon locating a neighbor-pair defining a pixel-count difference of at least two, donating one or more pixels from the larger AM half-tone cell of the neighbor pair to the smaller AM half-tone cell of the neighbor-pair, thereby modifying a border between the between AM half-tone cells of the neighbor pair;
   d. repeating the pixel-donating of step (c) until all cells of the AM half-tone screen have either N or N+1 pixels;
   d. defining a set of target positions within the AM halftone screen, the target positions distributed therein according to a blue-noise pattern;
   e. performing additional pixel-donating operations between AM half-tone cells so as to move all AM half-tone cells having N pixels to the target positions or to move all AM half-tone cells having N+1 pixels to the target positions so that completion of the additional pixel-donating operations yields a final AM half-tone screen;
   f. applying the final AM half-tone to a multi-level digital to generate an AM-halftoned image; and
   g. printing the AM half-toned image.

2. The method of claim 1, wherein centroids of the preliminary AM half-tone screen are substantially disposed on a perpendicular AM cell grid of uniform spacing.

3. The method of claim 2, wherein steps a-e are performed twice to yield first and second final AM half-tone screens, an angle between a grid-direction of the first AM half-tone screen and a grid-direction of the second AM half-tone screen is between 12 degrees and 18 degrees or between 27 degrees and 33 degrees or between 42 degrees and 48 degrees.

4. The method of claim 3 wherein:
   i. the first AM half-tone screen is applied to a first color-component of a multi-color multi-level image to yield a first AM-halftoned image;
   ii. the second AM half-tone screen is applied to a second color-component of the multi-color multi-level image to yield a second AM-halftoned image;
   iii. the first and second AM-halftone images are printed onto a common target surface respectively by first and second print-bars that are in series with each other.

5. An AM-halftone-based printing system comprising:
   a. an ink-jet printing module for printing images on a target surface by depositing droplets thereon;
   b. electronic circuitry configured to:
      i. generate a preliminary AM half-tone screen divided into a plurality of AM half-tone cells, a pixel-count of each AM half-tone cell being at least 10;
      ii. search through the AM half-tone screen to locate neighbor pairs of AM half-tone cells defining a pixel-count difference of at least two;
      iii. upon locating a neighbor-pair defining a pixel-count difference of at least two, donate one or more pixels from the larger AM half-tone cell of the neighbor pair to the smaller AM half-tone cell of the neighbor-pair, thereby modifying a border between the between AM half-tone cells of the neighbor pair;
      iv. repeating the pixel-donating until all cells of the AM half-tone screen have either N or N+1 pixels;

v. defining a set of target positions within the AM halftone screen, the target positions distributed therein according to a blue-noise pattern;
vi. performing additional pixel-donating operations between AM half-tone cells so as to move all AM half-tone cells having N pixels to the target positions or to move all AM half-tone cells having N+1 pixels to the target positions so that completion of the additional pixel-donating operations yields a final AM half-tone screen;
vii. applying the final AM half-tone to a multi-level digital to generate an AM-halftoned image;
viii. cause the ink-jet printing module to print the AM half-toned image.

6. A method of printing a multi-level and multi-color digital image, the method comprising:
a. respectively applying first and second level AM half-tone screens to first and second multi-level color-components of the multi-level and multi-color input digital image to respectively generate first and second target binary images; and
b. respectively print the first and second target binary images by the first and second print-bars respectively using first and second inks onto a common target surface, wherein:
   i. each of the first and second AM half-tone screens has at least 100 levels;
   ii. the first AM half-tone screen is divided into a plurality of AM half-tone cells such that:
      A. each half-tone cell of the first AM half-tone screen is of a first or second type;
      B. AM half-tone cells of the first type each have N pixels;
      C. AM half-tone cells of the second type each have N+1 pixels;
      D. half-tone cells of the first type are distributed within the first half-tone screen according to a blue-noise pattern;
      E. each of the AM half-tone cells of the first half-tone screen has substantially the same common shape;
      F. centroids of the first half-tone screen are disposed on a first perpendicular grid of uniform spacing;
      G. the centroid-grid defines a direction of the first half-tone screen;
   iii. the second AM half-tone screen is divided into a plurality of AM half-tone cells such that:
      A. each half-tone cell of the second AM half-tone screen is of the first or second type;
      B. half-tone cells of the first type are distributed within the second half-tone screen according to a blue-noise pattern;
      C. each of the AM half-tone cells of the second half-tone screen has substantially the same common shape;
      D. centroids of the second half-tone screen are disposed on a second perpendicular grid having the same uniform spacing as the first perpendicular grid of the first half-tone screen; and
      E. an angle between a grid-direction of the first perpendicular grid and a grid-direction of the second perpendicular grid is between 12 degrees and 18 degrees or between 27 degrees and 33 degrees or between 42 degrees and 48 degrees.

* * * * *